(12) United States Patent
Zhang et al.

(10) Patent No.: US 9,380,084 B2
(45) Date of Patent: Jun. 28, 2016

(54) METHOD, APPARATUS AND SYSTEM FOR IMPLEMENTING LOGIN OF IP TELEPHONE NUMBER

(71) Applicant: Huawei Technologies Co., Ltd., Shenzhen, Guangdong (CN)

(72) Inventors: Kai Zhang, Hangzhou (CN); Yiquan Zhu, Hangzhou (CN); Yuanhua Luan, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 14/139,210

(22) Filed: Dec. 23, 2013

(65) Prior Publication Data
US 2014/0177628 A1    Jun. 26, 2014

Related U.S. Application Data

(63) Continuation of application No. PCT/CN2012/087471, filed on Dec. 26, 2012.

(51) Int. Cl.
*H04L 29/06* (2006.01)
*H04L 29/08* (2006.01)
*H04L 29/12* (2006.01)

(52) U.S. Cl.
CPC ........ *H04L 65/1073* (2013.01); *H04L 63/0876* (2013.01); *H04L 67/16* (2013.01); *H04L 61/106* (2013.01); *H04L 61/1529* (2013.01); *Y02B 60/43* (2013.01)

(58) Field of Classification Search
None
See application file for complete search history.

(56) References Cited

U.S. PATENT DOCUMENTS

| 2003/0216143 | A1* | 11/2003 | Roese | G01S 5/02 455/456.1 |
| 2005/0163118 | A1* | 7/2005 | Steindl | H04L 29/12254 370/389 |
| 2005/0198218 | A1* | 9/2005 | Tasker | H04L 12/66 709/220 |

(Continued)

FOREIGN PATENT DOCUMENTS

| CN | 1921390 A | 2/2007 |
| CN | 101047717 A | 10/2007 |

(Continued)

OTHER PUBLICATIONS

"Draft Standard for Local and Metropolitan Networks: Station and Media Access Control Connectivity Discovery", IEEE P802.1AB/D9, Apr. 2004, 153 pages.

*Primary Examiner* — Andrew Lai
*Assistant Examiner* — Jamaal Henson

(57) ABSTRACT

Embodiments of the present invention disclose a method, an apparatus and a system for implementing login of an Internet Protocol (IP) telephone number. The method includes: after receiving a neighbor discovery protocol message of a data link layer sent by a connected IP telephone, obtaining, by a communication client, when determining that the communication client has used a communication account to log in to a communication server, from the communication server, an IP telephone number associated with the communication account, and sending the IP telephone number to the IP telephone, so that the IP telephone uses the IP telephone number to execute a login operation, thereby solving the problem in the prior art that the user operation is complex because a manual input manner needs to be used in logging in by using both the communication account and the IP telephone number.

20 Claims, 10 Drawing Sheets

(56) References Cited

U.S. PATENT DOCUMENTS

2007/0274308 A1* 11/2007 Kodaka ............ H04L 29/06027
  370/389
2007/0286178 A1* 12/2007 Kakiuchi ............ H04M 1/2473
  370/356
2009/0177782 A1* 7/2009 Blatherwick et al. ......... 709/228
2010/0246439 A1* 9/2010 Heath .................... H04L 67/18
  370/254

FOREIGN PATENT DOCUMENTS

| | | |
|---|---|---|
| CN | 101335794 A | 12/2008 |
| EP | 2 077 656 A2 | 7/2009 |

* cited by examiner

METHOD, APPARATUS AND SYSTEM FOR IMPLEMENTING LOGIN OF IP TELEPHONE NUMBER

CROSS-REFERENCE TO RELATED APPLICATIONS

This application is a continuation of International Application No. PCT/CN2012/087471, filed on Dec. 26, 2012, which is hereby incorporated by reference in its entirety.

TECHNICAL FIELD

Embodiments of the present invention relate to the field of communications technologies, and in particular, to a method, an apparatus and a system for implementing login of an IP telephone number.

BACKGROUND

With the development of communications technologies, more and more enterprises deploy a unified communication (UC, unified communication) system based on a voice over IP (Voice over Internet Protocol, VoIP) technology.

In a unified communication service, users of the same enterprise generally own an IP telephone number and a communication account at the same time. IP telephone number portability is an important function of the unified communication service. By using the IP telephone number portability function, a user can use an IP telephone number on different IP telephones, for example, when the user goes to an office location on business, the user can use the IP telephone number on an IP telephone at the office location. In the prior art, a user performs login by using a communication account in a manner of inputting the communication account and password on a communication client, and performs login by using an IP telephone number in a manner of manually inputting the IP telephone number and password on an IP telephone. With the prior art, if a user needs to perform login by using a communication account and an IP telephone number, a manual input manner is required for login, so the operation is complex.

SUMMARY

Embodiments of the present invention provide a method, an apparatus and a system for implementing login of an IP telephone number, so as to solve the problem in the prior art that the user operation is complex because a manual input manner needs to be used in logging in by using both a communication account and an IP telephone number.

In a first aspect, a method for implementing login of an IP telephone number is provided, where the method includes:

receiving, by a communication client, a neighbor discovery protocol message of a data link layer sent by an IP telephone, where the neighbor discovery protocol message includes an IP address and a port number of the IP telephone;

when determining that the communication client has used a communication account to log in to a communication server, obtaining, by the communication client, from the communication server, an IP telephone number associated with the communication account; and sending, by the communication client, the IP telephone number to the IP telephone according to the IP address and the port number of the IP telephone, so that the IP telephone uses the IP telephone number to execute a login operation.

In a first possible implementation manner of the first aspect, before the obtaining from the communication server, an IP telephone number associated with the communication account, the method further includes: determining that the neighbor discovery protocol message includes information indicating that the IP telephone supports associated login, where the information indicating that the IP telephone supports associated login is specifically used for indicating that the IP telephone supports using an IP telephone number associated with a communication account of a communication client that has logged in to execute a login operation.

With reference to the first aspect or the first possible implementation manner of the first aspect, in a second possible implementation manner, before the obtaining, from the communication server, an IP telephone number associated with the communication account, the method further includes: sending, by the communication client, to the IP telephone, information indicating that the communication client has logged in, an IP address of a personal computer PC where the communication client is located and a port number of the communication client, and receiving a login application request sent by the IP telephone according to the IP address of the PC and the port number of the communication client when the IP telephone determines that the communication client has logged in.

With reference to the second possible implementation manner of the first aspect, in a third possible implementation manner, the sending, to the IP telephone, information indicating that the communication client has logged in, an IP address of a PC and a port number of the communication client specifically includes:

sending a response message of the neighbor discovery protocol message to the IP telephone, where the response message includes the information indicating that the communication client has logged in, the IP address of the PC and the port number of the communication client; or, sending a response message of the neighbor discovery protocol message to the IP telephone, where the response message includes the IP address of the PC and the port number of the communication client, and sending, according to the IP address and the port number of the IP telephone, the information indicating that the communication client has logged in.

With reference to the first aspect or any one of the first to third possible implementation manners of the first aspect, in a fourth possible implementation manner, the receiving, by a communication client, a neighbor discovery protocol message sent by an IP telephone specifically includes: receiving, by the communication client, the neighbor discovery protocol message through a network adapter of the PC where the communication client is located, where a network adapter driver of the network adapter reports the neighbor discovery protocol message to an operating system on the PC after determining that the network adapter receives the neighbor discovery protocol message, so that the operating system transmits the neighbor discovery protocol message to the communication client when determining that the communication client is running.

With reference to the fourth possible implementation manner of the first aspect, in a fifth possible implementation manner, the neighbor discovery protocol message is specifically a link layer discovery protocol LLDP message; and the reporting, by a network adapter driver of the network adapter, the neighbor discovery protocol message to an operating system on the PC after determining that the network adapter receives the neighbor discovery protocol message specifically includes: reporting, by the network adapter driver of the network adapter, the neighbor discovery protocol message to the operating system on the PC when determining that the neighbor discovery protocol message is the LLDP message according to a destination address of the neighbor discovery protocol message received by the network adapter.

With reference to the first aspect or any one of the first to fifth possible implementation manners of the first aspect, in a sixth possible implementation manner, after the communication client sends the IP telephone number to the IP telephone according to the IP address and the port number of the IP telephone, the method further includes: logging out of the communication account when the communication client detects a user operation used for indicating logout of the communication account, and instructing the IP telephone to log out of the IP telephone number.

In a second aspect, a method for implementing login of an IP telephone number is provided, where the method includes:

when an IP telephone detects that an Ethernet port of the IP telephone is connected to a personal computer PC, sending a neighbor discovery protocol message of a data link layer to the PC, so that when the PC determines that a communication client is running on the PC, the PC transmits the neighbor discovery protocol message to the communication client, where the neighbor discovery protocol message includes an IP address and a port number of the IP telephone;

receiving, by the IP telephone, an IP telephone number associated with the communication account and sent by the communication client according to the IP address and the port number of the IP telephone when the communication client determines that the communication client has used a communication account to log in to a communication server; and using, by the IP telephone, the IP telephone number to execute a login operation.

In a first possible implementation manner of the second aspect, the neighbor discovery protocol message includes information indicating that the IP telephone supports associated login, so that the communication client sends the IP telephone number to the IP telephone when determining, according to the neighbor discovery protocol message, that the IP telephone supports associated login, where the information indicating that the IP telephone supports associated login is specifically used for indicating that the IP telephone supports using an IP telephone number associated with a communication account of a communication client that has logged in to execute a login operation.

With reference to the second aspect or the first possible implementation manner of the second aspect, in a second possible implementation manner, before the receiving, by the IP telephone, an IP telephone number associated with the communication account and sent by the communication client according to the IP address and the port number of the IP telephone when the communication client determines that the communication client has used a communication account to log in to a communication server, the method further includes:

receiving, by the IP telephone, information sent by the communication client indicating that the communication client has logged in, an IP address of the PC and a port number of the communication client, and when determining that the communication client has logged in, sending a login application request to the communication client according to the IP address of the PC and the port number of the communication client.

With reference to the second possible implementation manner of the second aspect, in a third possible implementation manner, the receiving, by the IP telephone, information sent by the communication client indicating that the communication client has logged in, an IP address of the PC and a port number of the communication client specifically includes:

receiving, by the IP telephone, a response message of the neighbor discovery protocol message sent by the communication client, where the response message includes the information indicating that the communication client has logged in, the IP address of the PC and the port number of the communication client; or, receiving, by the IP telephone, a response message of the neighbor discovery protocol message sent by the communication client, where the response message includes the IP address of the PC and the port number of the communication client, and receiving the information indicating that the communication client has logged in that is sent by the communication client according to the IP address and the port number of the IP telephone.

With reference to the second or third possible implementation manner of the second aspect, in a fourth possible implementation manner, before the sending a login application request to the communication client according to the IP address of the PC and the port number of the communication client, the method further includes: determining that the response message is received through an Ethernet port connected to the PC.

With reference to the second aspect or any one of the first to fourth possible implementation manners of the second aspect, in a fifth possible implementation manner, after the IP telephone uses the IP telephone number to execute a login operation, the method further includes: logging out of, by the IP telephone, the IP telephone number when receiving a logout instruction sent by the communication client.

With reference to the second aspect or any one of the first to fifth possible implementation manners of the second aspect, in a sixth possible implementation manner, before the using, by the IP telephone, the IP telephone number to execute a login operation, the method further includes: receiving, by the IP telephone, first authentication information that is sent by the communication client and received by the communication client from the communication server; and the using, by the IP telephone, the IP telephone number to execute a login operation specifically includes: sending, by the IP telephone, a login request that includes the IP telephone number and the first authentication information to the communication server, so that the communication server uses the first authentication information to perform authentication on the IP telephone after receiving the login request.

With reference to the second aspect or any one of the first to sixth possible implementation manners of the second aspect, in a seventh possible implementation manner, the IP telephone number and the first authentication information that are included in the login request are encrypted by using second authentication information; and before the sending, by the IP telephone, the login request, the method further includes: sending the second authentication information to the communication server through the communication client, so that the communication server uses the second authentication information to decrypt the encrypted IP telephone number and first authentication information included in the login request.

In a third aspect, a communication apparatus is provided, where the communication apparatus includes: a receiving unit, a login unit, an obtaining unit and a sending unit, where the receiving unit is configured to receive a neighbor discovery protocol message of a data link layer sent by an IP telephone, where the neighbor discovery protocol message includes an IP address and a port number of the IP telephone;

the login unit is configured to use a communication account to log in to a communication server;

the obtaining unit is configured to: when the receiving unit receives the neighbor discovery protocol message, and determines that the login unit has used the communication account to log in to the communication server, obtain from the communication server, an IP telephone number associated with the communication account, and transmit the IP telephone number to the sending unit; and the sending unit is configured to receive the IP telephone number from the obtaining unit, and send the IP telephone number to the IP telephone according to the IP address and the port number of the IP telephone, so that the IP telephone uses the IP telephone number to execute a login operation.

In a first possible implementation manner of the third aspect, the communication apparatus further includes a judging unit;

the receiving unit is further configured to transmit the neighbor discovery protocol message to the judging unit;

the judging unit is configured to receive the neighbor discovery protocol message from the receiving unit, determine whether the neighbor discovery protocol message includes information indicating that the IP telephone supports associated login, and transmit a determination result to the obtaining unit, where the information indicating that the IP telephone supports associated login is specifically used for indicating that the IP telephone supports using an IP telephone number associated with a communication account of a communication apparatus that has logged in to execute a login operation; and the obtaining unit is specifically configured to receive the determination result from the judging unit, and when the determination result is yes, obtain, from the communication server, the IP telephone number associated with the communication account.

With reference to the third aspect or the first possible implementation manner of the third aspect, in a second possible implementation manner, the sending unit is further configured to send, to the IP telephone, information indicating that the communication apparatus has logged in, an IP address of a personal computer PC where the communication apparatus is located and a port number of the communication apparatus; and the receiving unit is further configured to receive a login application request sent by the IP telephone according to the IP address of the PC and the port number of the communication apparatus when the IP telephone determines that the communication apparatus has logged in.

With reference to the second possible implementation manner of the third aspect, in a third possible implementation manner, the sending unit being configured to send, to the IP telephone, information indicating that the communication apparatus has logged in, an IP address of a personal computer PC where the communication apparatus is located and a port number of the communication apparatus specifically includes:

the sending unit being configured to send a response message of the neighbor discovery protocol message to the IP telephone, where the response message includes the information indicating that the communication apparatus has logged in, the IP address of the PC and the port number of the communication apparatus; or, the sending unit being configured to send a response message of the neighbor discovery protocol message to the IP telephone, where the response message includes the IP address of the PC and the port number of the communication apparatus, and configured to send, according to the IP address and the port number of the IP telephone, the information indicating that the communication apparatus has logged in.

With reference to the third aspect or any one of the first to third possible implementation manners of the third aspect, in a fourth possible implementation manner, the communication apparatus further includes a logout unit, configured to log out of the communication account when detecting a user operation used for indicating logout of the communication account, and instruct the IP telephone to log out of the IP telephone number.

In a fourth aspect, an IP telephone is provided, where the IP telephone includes: a detection unit, a sending unit, a receiving unit and a login unit, where the detection unit is configured to detect whether an Ethernet port of the IP telephone is connected to a personal computer PC, and transmit a detection result to the sending unit;

the sending unit is configured to receive the detection result sent by the detection unit, and when the detection result is that the Ethernet port of the IP telephone is connected to the PC, send a neighbor discovery protocol message of a data link layer to the PC, so that when it is determined that a communication client is running on the PC, the PC transmits the neighbor discovery protocol message to the communication client, where the neighbor discovery protocol message includes an IP address and a port number of the IP telephone;

the receiving unit is configured to receive an IP telephone number associated with the communication account and sent by the communication client according to the IP address and the port number of the IP telephone when the communication client determines that the communication client has used a communication account to log in to a communication server, and transmit the IP telephone number to the login unit; and the login unit is configured to receive the IP telephone number from the receiving unit, and use the IP telephone number to execute a login operation.

In a first possible implementation manner of the fourth aspect, the neighbor discovery protocol message sent by the sending unit includes information indicating that the IP telephone supports associated login, so that the communication client sends the IP telephone number to the IP telephone when determining, according to the neighbor discovery protocol message, that the IP telephone supports associated login, where the information indicating that the IP telephone supports associated login is specifically used for indicating that the IP telephone supports using an IP telephone number associated with a communication account of a communication client that has logged in to execute a login operation.

With reference to the fourth aspect or the first possible implementation manner of the fourth aspect, in a second possible implementation manner, the IP telephone further includes a determining unit;

the receiving unit is further configured to receive information sent by the communication client indicating that the communication client has logged in, an IP address of the PC and a port number of the communication client;

the determining unit is configured to determine, according to the information indicating that the communication client has logged in, that the communication client has logged in, and transmit a determination result to the sending unit; and the sending unit is further configured to receive the determination result sent by the determining unit, and send a login application request to the communication client according to the IP address of the PC and the port number of the communication client.

With reference to the second possible implementation manner of the fourth aspect, in a third possible implementation manner, the receiving unit being configured to receive the information sent by the communication client indicating that the communication client has logged in, the IP address of the PC and the port number of the communication client specifically includes:

the receiving unit being configured to receive a response message of the neighbor discovery protocol message sent by the communication client, where the response message includes the information indicating that the communication client has logged in, the IP address of the PC and the port number of the communication client; or, the receiving unit being configured to receive a response message of the neighbor discovery protocol message sent by the communication client, where the response message includes the IP address of the PC and the port number of the communication client, and configured to receive the information indicating that the communication client has logged in that is sent by the communication client according to the IP address and the port number of the IP telephone.

With reference to the fourth aspect or any one of the first to third possible implementation manners of the fourth aspect, in a fourth possible implementation manner, the IP telephone further includes a logout unit;

the receiving unit is further configured to receive a logout instruction sent by the communication client, and transmit the logout instruction to the logout unit; and the logout unit is configured to receive the logout instruction from the receiving unit, and log out of the IP telephone number.

In a fifth aspect, a communication system is provided, where the communication system includes: an IP telephone, a communication client and a communication server, where the IP telephone is connected, through an Ethernet port, to a personal computer PC where the communication client is located, where, the IP telephone is configured to: when it is detected that the Ethernet port of the IP telephone is connected to the PC, send a neighbor discovery protocol message of a data link layer to the PC, so that the PC, when determining that the communication client is running, transmits the neighbor discovery protocol message to the communication client, where the neighbor discovery protocol message includes an IP address and a port number of the IP telephone; receive an IP telephone number associated with the communication account and sent by the communication client according to the IP address and the port number of the IP telephone when the communication client determines that the communication client has used a communication account to log in to a communication server; and use the IP telephone number to execute a login operation;

the communication client is configured to receive the neighbor discovery protocol message; when determining that the communication client has used the communication account to log in to the communication server, obtain, from the communication server, the IP telephone number associated with the communication account; and send the IP telephone number to the IP telephone according to the IP address and the port number of the IP telephone; and the communication server is configured to send the IP telephone number associated with the communication account to the communication client.

In a first possible implementation manner of the fifth aspect, the communication client is further configured to: when receiving the neighbor discovery protocol message, determine that the neighbor discovery protocol message includes information indicating that the IP telephone supports associated login, where the information indicating that the IP telephone supports associated login is specifically used for indicating that the IP telephone supports using an IP telephone number associated with a communication account of a communication client that has logged in to execute a login operation.

With reference to the fifth aspect or the first possible implementation manner of the fifth aspect, in a second possible implementation manner, the communication client is further configured to send, to the IP telephone, information indicating that the communication client has logged in, an IP address of the personal computer PC where the communication client is located and a port number of the communication client, and receive a login application request sent by the IP telephone according to the IP address of the PC and the port number of the communication client when it is determined that the communication client has logged in; and the IP telephone is further configured to receive the information sent by the communication client indicating that the communication client has logged in, the IP address of the personal computer PC where the communication client is located and the port number of the communication client, and when it is determined that the communication client has logged in, send the login application request to the communication client according to the IP address of the PC and the port number of the communication client.

With reference to the fifth aspect or the first or second possible implementation manner of the fifth aspect, in a third possible implementation manner, the communication client is further configured to log out of the communication account when a user operation used for indicating logout of the communication account is detected, and instruct the IP telephone to log out of the IP telephone number; and the IP telephone is further configured to log out of the IP telephone number when receiving a logout instruction sent by the communication client.

In a sixth aspect, a communication terminal is provided, where the communication terminal includes: a processor, a network adapter, a memory and a bus, where mutual communication is completed between the processor, the network adapter and the memory through the bus, where, the memory is configured to store a program, where the program includes a network adapter driver, an operating system and a communication client;

the processor is configured to execute the program stored by the memory;

the network adapter is configured to receive a neighbor discovery protocol message of a data link layer sent by an IP telephone, where the neighbor discovery protocol message includes an IP address and a port number of the IP telephone;

the network adapter driver is configured to report the neighbor discovery protocol message to the operating system after it is determined that the network adapter receives the neighbor discovery protocol message;

the operating system is configured to transmit the neighbor discovery protocol message to the communication client when it is determined that the communication client is running; and the communication client is configured to: when determining that the communication client has used a communication account to log in to a communication server, obtain, from the communication server, an IP telephone number associated with the communication account; and send the IP telephone number to the IP telephone through the network adapter according to the IP address and the port number of the IP telephone, so that the IP telephone uses the IP telephone number to execute a login operation.

In a first possible implementation manner of the sixth aspect, the communication client is further configured to: determine that the neighbor discovery protocol message includes information indicating that the IP telephone supports associated login, where the information indicating that the IP telephone supports associated login is specifically used for indicating that the IP telephone supports using an IP telephone number associated with a communication account of a communication client that has logged in to execute a login operation.

With reference to the sixth aspect or the first possible implementation manner of the sixth aspect, in a second possible implementation manner, the communication client is further configured to send to the IP telephone through the network adapter, information indicating that the communication client has logged in, an IP address of the communication terminal and a port number of the communication client, and receive, through the network adapter, a login application request sent by the IP telephone according to the IP address of the communication terminal and the port number of the communication client when it is determined that the communication client has logged in.

With reference to the second possible implementation manner of the sixth aspect, in a third possible implementation manner, the communication client being configured to send to the IP telephone through the network adapter, information indicating that the communication client has logged in, an IP address of the communication terminal and a port number of the communication client specifically includes: the communication client being configured to send to the IP telephone through the network adapter, a response message of the neighbor discovery protocol message, where the response message includes the information indicating that the communication client has logged in, the IP address of the communication terminal and the port number of the communication client; or, the communication client being configured to send to the IP telephone through the network adapter, a response message of the neighbor discovery protocol message, where the response message includes the IP address of the communication terminal and the port number of the communication client, and configured to send to the IP telephone through the network adapter, according to the IP address and the port number of the IP telephone, the information indicating that the communication client has logged in.

With reference to the sixth aspect or any one of the first to third possible implementation manners of the sixth aspect, in a fourth possible implementation manner, the network adapter driver is specifically configured to report the neighbor discovery protocol message to the operating system when it is determined that the neighbor discovery protocol message is a link layer discovery protocol LLDP message according to a destination address of the neighbor discovery protocol message.

With reference to the sixth aspect or any one of the first to fourth possible implementation manners of the sixth aspect, in a fifth possible implementation manner, the communication client is further configured to log out of the communication account when a user operation used for indicating logout of the communication account is detected, and instruct the IP telephone to log out of the IP telephone number.

In a seventh aspect, an IP telephone is provided, where the IP telephone includes: a processor, a transmitter, a receiver, a memory and a bus, where mutual communication is completed between the processor, the transmitter, the receiver, and the memory through the bus, where, the memory is configured to store a program, where the program includes a detection unit and a login unit;

the processor is configured to execute the program stored by the memory;

the detection unit is configured to detect whether an Ethernet port of the IP telephone is connected to a personal computer PC;

the transmitter is configured to: when the detection result of the detection unit is that the Ethernet port of the IP telephone is connected to the PC, send a neighbor discovery protocol message of a data link layer to the PC, so that when it is determined that a communication client is running on the PC, the PC transmits the neighbor discovery protocol message to the communication client, where the neighbor discovery protocol message includes an IP address and a port number of the IP telephone; and the neighbor discovery protocol message may specifically be a link layer discovery protocol LLDP message;

the receiver is configured to receive an IP telephone number associated with the communication account and sent by the communication client according to the IP address and the port number of the IP telephone when the communication client determines that the communication client has used a communication account to log in to a communication server; and the login unit is configured to use the IP telephone number received by the receiver to execute a login operation.

In a first possible implementation manner of the seventh aspect, the neighbor discovery protocol message sent by the transmitter includes information indicating that the IP telephone supports associated login, so that the communication client sends the IP telephone number to the IP telephone when determining, according to the neighbor discovery protocol message, that the IP telephone supports associated login, where the information indicating that the IP telephone supports associated login is specifically used for indicating that the IP telephone supports using an IP telephone number associated with a communication account of a communication client that has logged in to execute a login operation.

With reference to the seventh aspect or the first possible implementation manner of the seventh aspect, in a second possible implementation manner, the program further includes a determining unit; the receiver is further configured to receive information sent by the communication client indicating that the communication client has logged in, an IP address of a personal computer PC where the communication client is located and a port number of the communication client; the determining unit is configured to determine that the communication client has logged in according to the information indicating that the communication client has logged in; and the transmitter is further configured to send a login application request to the communication client according to the IP address of the PC and the port number of the communication client.

With reference to the first possible implementation manner of the seventh aspect, in a third possible implementation manner, the receiver being configured to receive information sent by the communication client indicating that the communication client has logged in, an IP address of a personal computer PC where the communication client is located and a port number of the communication client specifically includes:

the receiver being configured to receive a response message of the neighbor discovery protocol message sent by the communication client, where the response message includes the information indicating that the communication client has logged in, the IP address of the PC and the port number of the communication client; or, the receiver being configured to receive a response message of the neighbor discovery protocol message sent by the communication client, where the response message includes the IP address of the PC and the port number of the communication client, and configured to receive the information indicating that the communication client has logged in that is sent by the communication client according to the IP address and the port number of the IP telephone.

With reference to the seventh aspect or any one of the first to third possible implementation manners of the seventh aspect, in a fourth possible implementation manner, the receiver is further configured to receive a logout instruction sent by the communication client; and the program further includes a logout unit, configured to log out of the IP telephone number when the receiver receives the logout instruction sent by the communication client.

In an eighth aspect, a computer program product is provided, where the computer program product includes computer program codes, and when the computer program codes are executed by a computer, the computer program codes can enable the computer to execute steps of the first aspect or any one of the first to sixth possible implementation manners of the first aspect.

In a ninth aspect, a computer program product is provided, where the computer program product includes computer program codes, and when the computer program codes are executed by a computer, the computer program codes can enable the computer to execute steps of the second aspect or any one of the first to seventh possible implementation manners of the second aspect.

In a tenth aspect, a computer readable storage medium is provided, where the computer readable storage medium stores computer program codes, and when the computer program codes are executed by a computer, the computer program codes can enable the computer to execute steps of the first aspect or any one of the first to sixth possible implementation manners of the first aspect.

In an eleventh aspect, a computer readable storage medium is provided, where the computer readable storage medium stores computer program codes, and when the computer program codes are executed by a computer, the computer program codes can enable the computer to execute steps of the second aspect or any one of the first to seventh possible implementation manners of the second aspect.

According to the embodiments of the present invention, after receiving a neighbor discovery protocol message of a data link layer sent by a connected IP telephone, a communication client obtains, when the communication client has used a communication account to log in to a communication server, from the communication server, an IP telephone number associated with the communication account, and sends the IP telephone number to the IP telephone, so that the IP telephone uses the IP telephone number to execute a login operation, thereby solving the problem in the prior art that the user operation is complex because a manual input manner needs to be used in logging in by using both the communication account and the IP telephone number.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
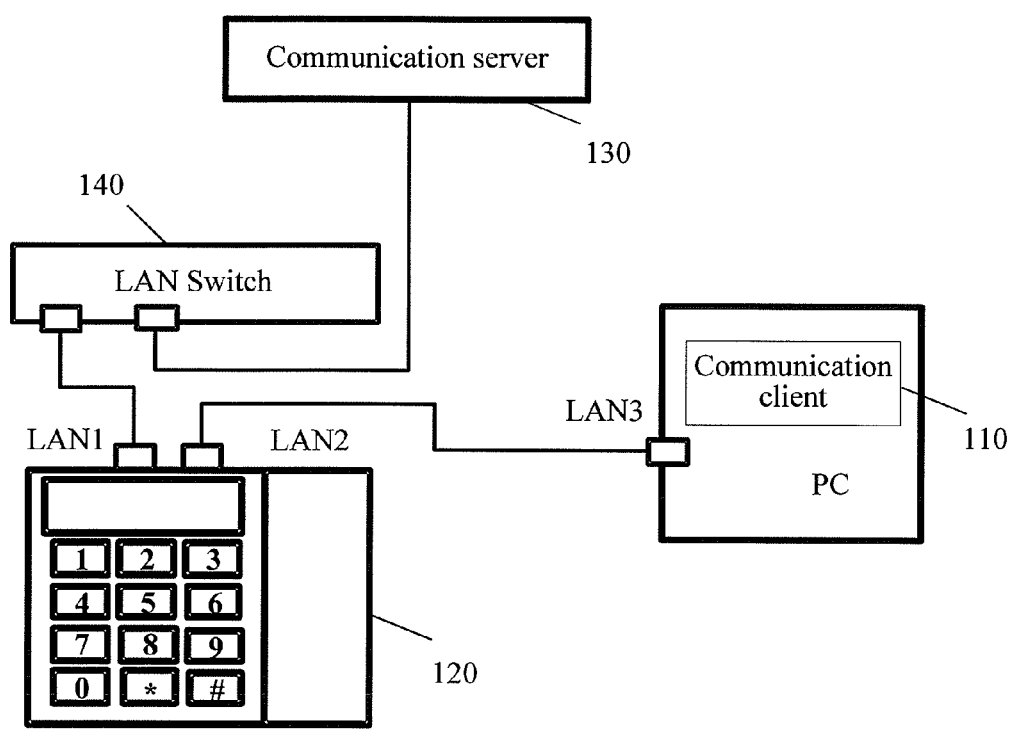
FIG. 1 is a schematic architecture diagram of a communication system according to an embodiment of the present invention.

FIG. 1 is a schematic architecture diagram of a communication system according to an embodiment of the present invention. The communication system includes a communication client 110, an IP telephone 120, a communication server 130, and a LAN switch (LAN switch) 140, where the communication client 110 is running in a personal computer (PC, Personal computer), and the communication client 110 may specifically be a unified communication client, an instant message client, a softphone client, and so on.

As shown in FIG. 1, the IP telephone 120 is provided with two Ethernet ports (the Ethernet port is referred to as a LAN port subsequently), such as LAN1 and LAN2 in FIG. 1. The PC where the communication client 110 is located is provided with one LAN port (such as LAN3 in the drawing), and the LAN port is located on a network adapter of the PC.

One LAN port (such as LAN2 in the drawing) in the IP telephone 120 is connected to a LAN port of the PC where the communication client 110 is located through an Ethernet cable, and the other LAN port (such as LAN1 in the drawing)

in the IP telephone 120 is connected to the LAN switch 140, so as to connect to the communication server 130 through the LAN switch 140.

The two LAN ports of the IP telephone 120 form a local exchange network. When receiving, through the LAN1 port, a data packet, sent by the LAN switch 140, whose destination address is not an address of the IP telephone, the IP telephone 120 sends the data packet to the PC through the LAN2 port; when receiving, through the LAN2 port, a data packet, sent by the PC, whose destination address is not an address of the IP telephone, the IP telephone sends the data packet to the LAN switch 140 through the LAN1 port. In the schematic architecture diagram of the communication system, the communication client 110 is connected to the LAN switch 140 through the local exchange network formed by the two LAN ports of the IP telephone 120, so as to connect to the communication server 130 through the LAN switch 140.

In the embodiment of the present invention, when detecting that the LAN port of the IP telephone 120 is connected to the PC, the IP telephone 120 sends a neighbor discovery protocol message of a data link layer to the PC, where the neighbor discovery protocol message includes an IP address and a port number of the IP telephone 120, the PC transmits the received neighbor discovery protocol message to the communication client 110 running on the PC, after receiving the neighbor discovery protocol message, when determining that the communication client 110 has used a communication account to log in to the communication server 130, the communication client 110 obtains, from the communication server 130, an IP telephone number associated with the communication account, and sends the IP telephone number to the IP telephone according to the IP address and the port number of the IP telephone, and the IP telephone 120 uses the received IP telephone number to execute a login operation, thereby solving the problem in the prior art that the user operation is complex because a manual input manner needs to be used in logging in by using both the communication account and the IP telephone number.

Figure 2:
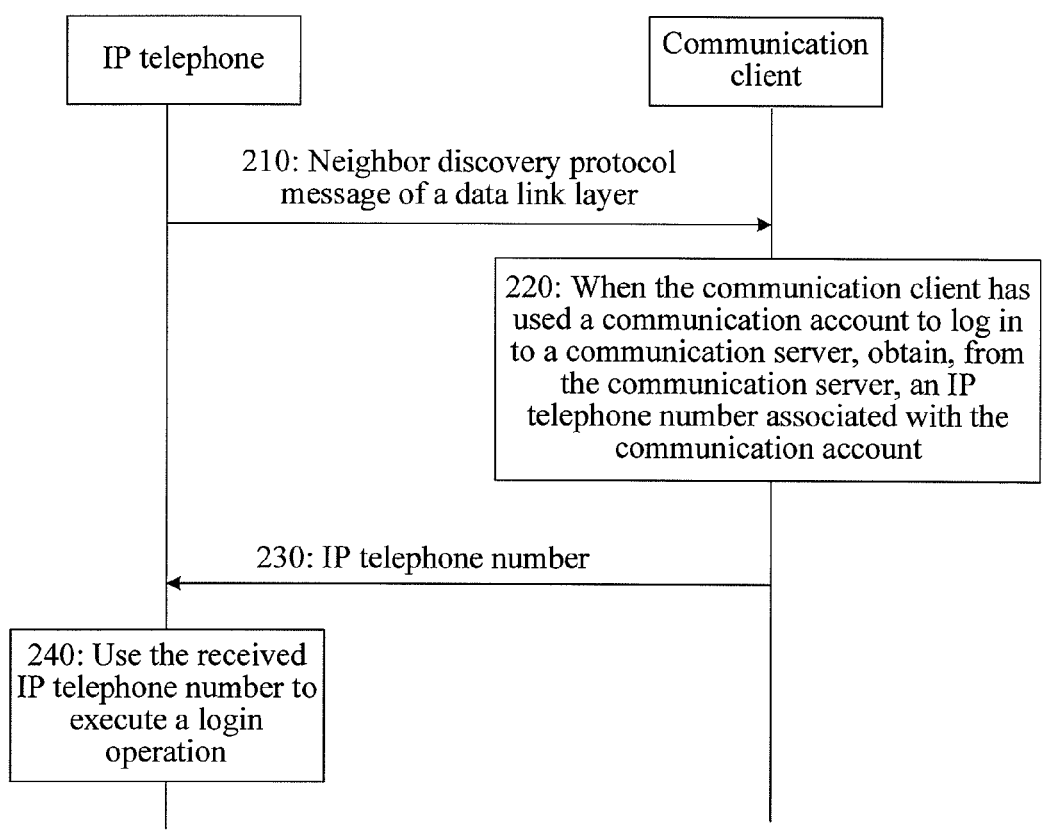
FIG. 2 is a schematic flowchart of a method according to Embodiment 1 of the present invention.

FIG. 2 is a schematic flowchart of a method for implementing login of an IP telephone number according to Embodiment 1 of the present invention.

Step 210: When an IP telephone detects that a LAN port of the IP telephone is connected to a personal computer PC, send a neighbor discovery protocol message of a data link layer to the PC, so that when the PC determines that a communication client is running on the PC, the PC transmits the neighbor discovery protocol message to the communication client, where the neighbor discovery protocol message includes an IP address and a port number of the IP telephone.

After a network adapter on the PC receives the neighbor discovery protocol message, a network adapter driver of the network adapter reports the neighbor discovery protocol message to an operating system on the PC after determining that the network adapter receives the neighbor discovery protocol message, and the operating system transmits the neighbor discovery protocol message to the communication client when determining that the communication client on the PC is running.

After receiving data sent by the IP telephone, the network adapter sends an interrupt to a processor of the PC. The processor searches an interrupt vector table in the operating system according to an interrupt number included in the interrupt, to obtain an interrupt program processing address registered in the operating system when the network adapter driver of the network adapter is installed, and invokes the network adapter driver according to the interrupt program processing address. The network adapter driver determines whether the received data is a neighbor discovery protocol message, and if yes, reports the neighbor discovery protocol message to the operating system. When determining that the communication client is running according to registration information registered in the operating system when the communication client starts running, the operating system transmits the neighbor discovery protocol message to the communication client through a callback address of the registration information.

The neighbor discovery protocol message of the data link layer may specifically be one of the following messages: an LLDP (Link Layer Discovery Protocol, link layer discovery protocol) message, a CDP (Cisco Discovery Protocol, Cisco discovery protocol) message, and a Microsoft's LLTD (Microsoft's Link Layer Topology Discovery, Microsoft's link layer topology discovery protocol) message.

If the neighbor discovery protocol message is specifically the LLDP message, the determining, by the network adapter driver, whether the received data is a neighbor discovery protocol message specifically includes: determining whether the message is the LLDP message according to the destination address of the received data, for example, determining whether the destination address of the data is an LLDP broadcast MAC (Media Access Control, media access control) address (for example, 01:80:c2:00:00:0e or 01:80:c2:00:00:03 or 01:80:c2:00:00:00), and if yes, determining that the received message is the LLDP message.

Step 220: When determining that the communication client has used a communication account to log in to a communication server, the communication client obtains, from the communication server, an IP telephone number associated with the communication account.

The neighbor discovery protocol message includes information (for example, apparatus type information) used for indicating that a sending party of the neighbor discovery protocol message is the IP telephone. After receiving the neighbor discovery protocol message, the communication client may recognize, according to the information, that the neighbor discovery protocol message is received from the IP telephone, and obtain the IP telephone number when recognizing that the neighbor discovery protocol message is received from the IP telephone.

Specifically, the communication client sends an associated number obtaining request to the communication server, and receives an IP telephone number associated with the communication account and returned by the communication server.

It should be noted that, before step 220, in the communication system, the communication account and the IP telephone number allocated for the same user are associated and stored on the communication server. The communication client uses the communication account input by the user to log in to the communication server. Correspondingly, in step 220, the IP telephone number associated with the communication account and obtained from the communication server by the communication client is the IP telephone number of the user.

Preferably, the neighbor discovery protocol message further includes information indicating that the IP telephone supports associated login. Further, when determining, according to the neighbor discovery protocol message, that the IP telephone supports associated login, the communication client obtains the IP telephone number from the communication server, where that the IP telephone supports associated login refers to that the IP telephone supports using an IP telephone number associated with a communication account of a communication client that has logged in to execute a login operation.

The communication server may specifically be an SIP Server, and the communication client interacts with the SIP Server through an SIP protocol.

Step 230: The communication client sends the IP telephone number to the IP telephone according to the IP address and the port number of the IP telephone.

Step 240: The IP telephone uses the received IP telephone number to execute a login operation.

It should be noted that, the communication server to which the IP telephone logs in by using the IP telephone number may be the same as or different from the communication server in step 220.

According to Embodiment 1 of the present invention, a communication client receives a neighbor discovery protocol message of a data link layer sent by an IP telephone connected to a PC where the communication client is located, and when determining that the communication client has used a communication account to log in to a communication server, sends an IP telephone number associated with the communication account to the IP telephone, and the IP telephone uses the received IP telephone number to execute a login operation, thereby solving the problem in the prior art that the user operation is complex because a manual input manner needs to be used in logging in by using both the communication account and the IP telephone number.

Preferably, after the receiving, by the communication client, the neighbor discovery protocol message and before step 220, the method may further include: determining, by the communication client, whether a user operation used for indicating login of an IP telephone number is detected (for example, an operation of a user clicking an "associated login" button on the communication client is detected), and when detecting the user operation, executing steps 220-230, thereby implementing login of the IP telephone number according to the current intention of the user.

Preferably, after step 240, the method may further include: logging out of, by the communication client, the communication account when detecting a user operation used for indicating logout of the communication account (for example, detecting that a user clicks a "logout" button or a button for closing the communication client), and instructing the IP telephone to log out of the IP telephone number. The IP telephone logs out of the IP telephone number according to the instruction of the communication client. Specifically, the communication client sends a logout request to the communication server to log out of the communication account; and sends a logout instruction to the IP telephone to instruct the IP telephone to log out of the IP telephone number. Through the foregoing method, logout of an IP telephone number is implemented without an additional operation of the user, thereby ensuring the use security of the IP telephone number conveniently.

Optionally, after the receiving, by the communication client, the neighbor discovery protocol message, the method further includes: sending, by the communication client, an IP address of the PC and a port number of the communication client to the IP telephone, and when determining that the communication client has used the communication account to log in to the communication server, sending, to the IP telephone, information indicating that the communication client has logged in. When determining that the communication client has logged in according to the received information indicating that the communication client has logged in, the IP telephone sends a login application request to the communication client according to the IP address of the PC and the port number of the communication client. After receiving the login application request sent by the IP telephone, the communication client executes the operation of obtaining, from the communication server, an IP telephone number associated with the communication account in step 220 and executes step 230.

Specifically, the communication client may send, to the IP telephone, the information indicating that the communication client has logged in, the IP address of the PC and the port number of the communication client in the following two manners:

In an optional implementation manner: after receiving the neighbor discovery protocol message, the communication client sends a response message of the neighbor discovery protocol message to the IP telephone, where the response message includes the IP address of the PC and the port number of the communication client. When the communication account is used to log in to the communication server, sending, according to the IP address and the port number of the IP telephone, information indicating that the communication client has logged in may specifically be: sending, according to the IP address and the port number of the IP telephone, to the IP telephone a TCP (Transmission Control Protocol, transmission control protocol) message or a UDP (User Datagram Protocol, user datagram protocol) message that includes the information indicating that the communication client has logged in.

In another optional implementation manner: if when receiving the neighbor discovery protocol message, the communication client has used the communication account to log in to the communication server, the response message includes the information indicating that the communication client has logged in, the IP address of the PC and the port number of the communication client; if when receiving the neighbor discovery protocol message, the communication client has not used the communication account to log in to the communication server, when the communication client has used the communication account to log in to the communication server subsequently, sending, by the communication client, according to the IP address and the port number of the IP telephone, the information indicating that the communication client has logged in, may specifically be: sending to the IP telephone according to the IP address and the port number of the IP telephone, a TCP message or a UDP message that includes the information indicating that the communication client has logged in. It should be noted that, if when receiving the neighbor discovery protocol message, the communication client has not used the communication account to log in to the communication server, the response message may include information indicating that the communication client has not logged.

In the foregoing two optional implementation manners, subsequently if detecting that a user clicks the "logout" button, the communication client instructs the IP telephone to log out of the IP telephone number, when subsequently using the communication account input by the user or other communication accounts to log in to the communication server, the communication client sends to the IP telephone again according to the IP address and the port number of the IP telephone, the information indicating that the communication client has logged in, and when receiving a new login application request sent by the IP telephone when determining that the communication client has logged in, obtains an IP telephone number associated with the currently logged-in communication account from the communication server and sends the IP telephone number to the IP telephone.

After receiving the response message, the IP telephone may further determine whether the response message is received through a LAN port connected to the PC where the communication client is located, and when the determination result is yes, send the login application request according to the IP address of the PC and the port number of the communication client that are included in the response message.

Preferably, after the determining, by the IP telephone according to received information indicating the communication client has logged in, that the communication client has logged in, and before the sending the login application request, the method may further include: determining whether a user operation used for instructing to log the IP telephone number is detected (for example, an operation of a user pressing an "associated login" button on the IP telephone is detected), and when detecting the user operation, sending the login application request.

It should be noted that, when detecting that a user clicks a button used for closing the communication client, the communication client may send, to the IP telephone, information used for indicating that the communication client is closed, and after the IP telephone determines that the communication client is closed, re-execute step 210.

Figure 3:
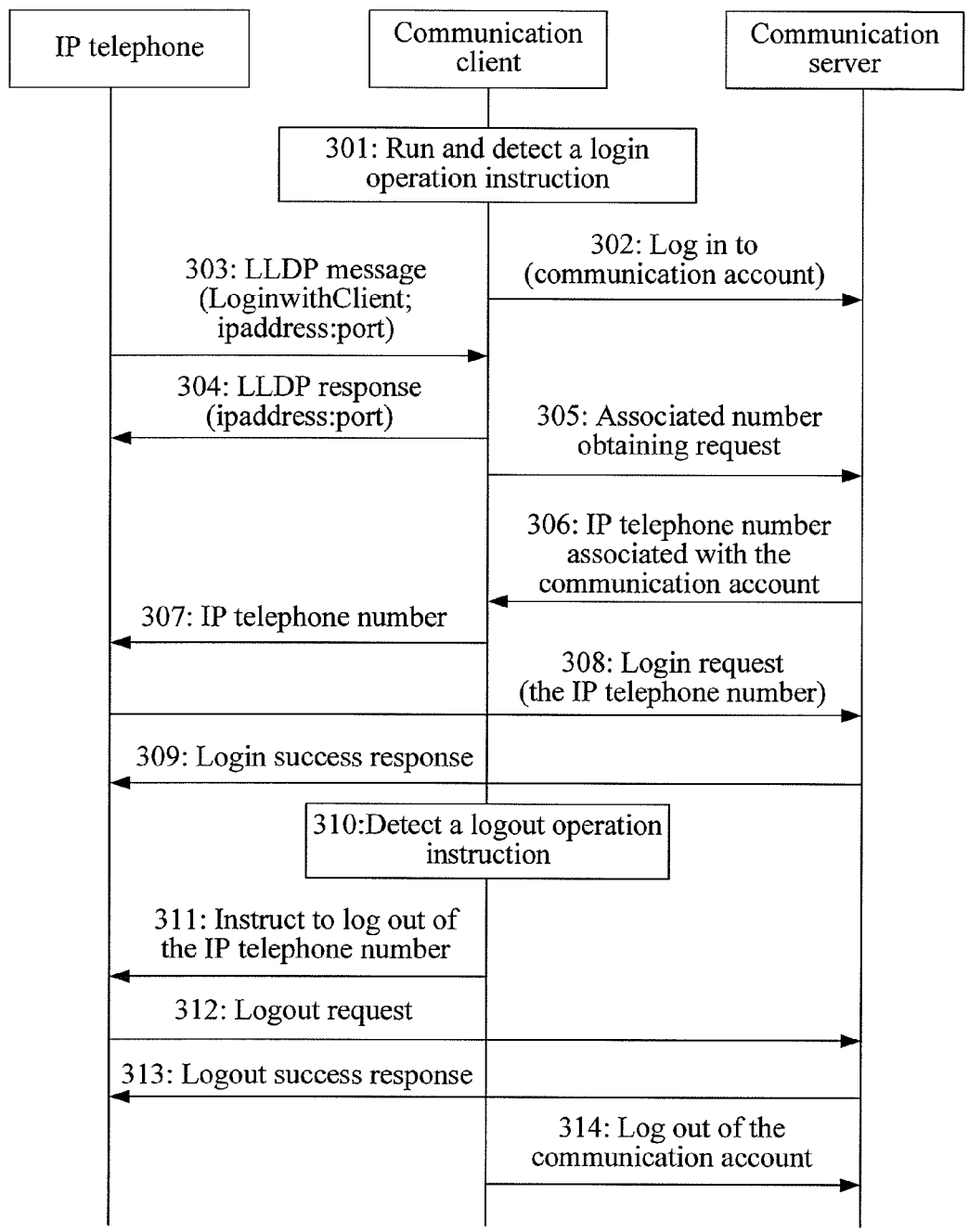
FIG. 3 is a schematic flowchart of an exemplary implementation manner A according to Embodiment 1 of the present invention.
Figure 4:
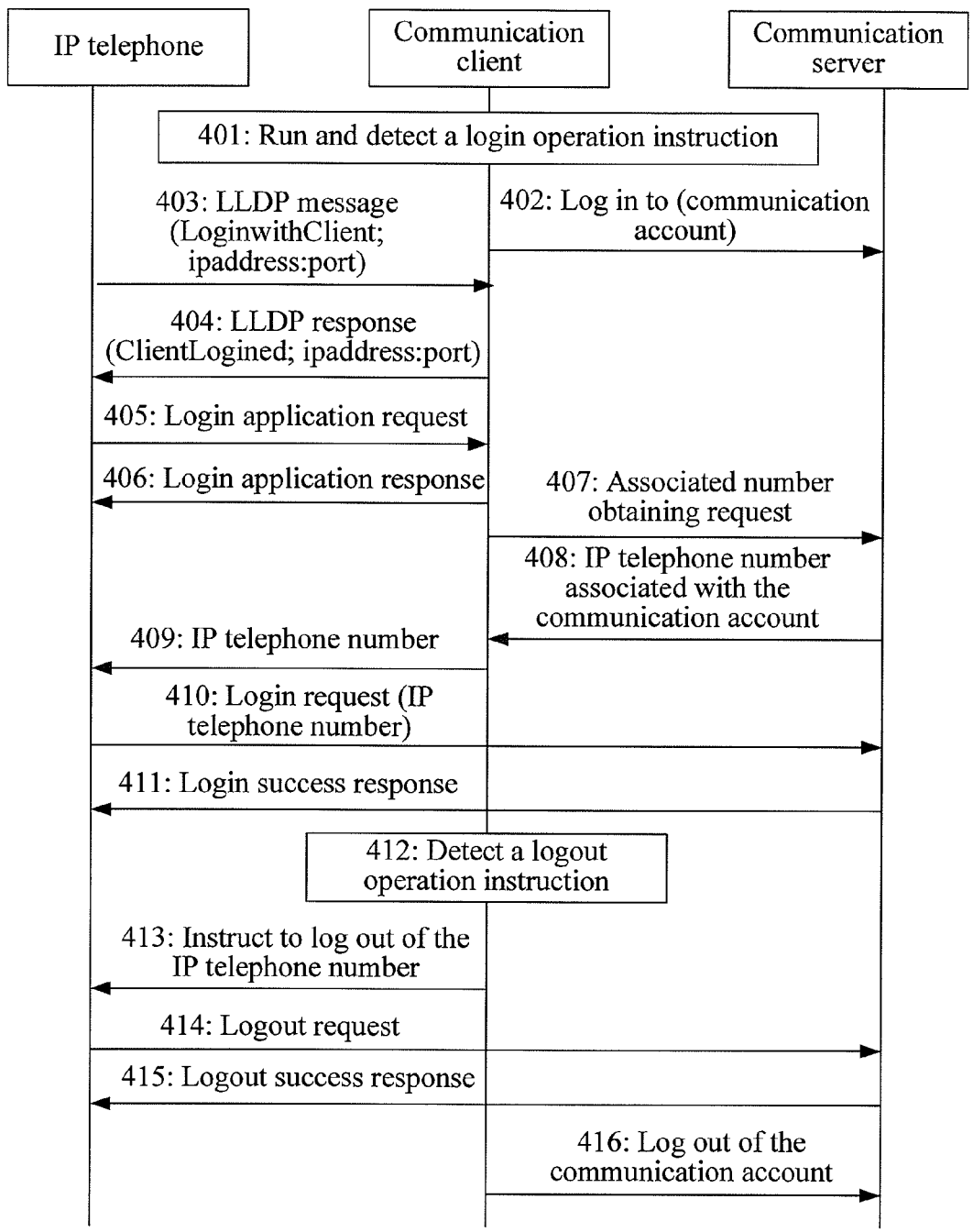
FIG. 4 is a schematic flowchart of an exemplary implementation manner B according to Embodiment 1 of the present invention.

An exemplary implementation manner A and an exemplary implementation manner B of Embodiment 1 of the present invention are described below with reference to FIG. 3 and FIG. 4 respectively.

Application scenarios of the exemplary implementation manner A and the exemplary implementation manner B are illustrated in the following:

A user owns a communication account (for example: a@abc.com) and an IP telephone number (for example: 6000) at the same time, and the communication account and the IP telephone number are associated and stored in a communication server (for example: an SIP Server). An IP telephone is connected to a PC machine through a LAN port (for example, as shown in FIG. 1, LAN3 port of the PC is connected to LAN2 port of the IP telephone).

The exemplary implementation manner A of Embodiment 1 of the present invention is described below with reference to FIG. 3.

Step 301-302: After detecting a login operation instruction, a communication client running on a PC uses a communication account a@abc.com input by a user to log in to a communication server.

Specifically, after detecting that an operation of the user clicking a "login" button, the communication client obtains a communication account and a password input by the user, and sends a login request that includes the communication account and the password to the communication server to use the communication account to log in to the communication server.

Step 303: An IP telephone sends an LLDP message to the communication client running on the PC when detecting that an Ethernet port of the IP telephone is connected to the PC, where the LLDP message includes information used for indicating that the IP telephone supports associated login, and includes an IP address and a port number of the IP telephone.

Specifically, whether the LLDP message includes a set field may indicate whether the IP telephone supports associated login, that is, if the LLDP message includes the set field, it indicates that the IP telephone supports associated login; specifically, different values of the set field included in the LLDP message may also be used to indicate whether the IP telephone supports associated login, for example, if a value of the set field is 1, it indicates that the IP telephone supports associated login; if a value of the set field is 0, it indicates that the IP telephone does not support associated login.

Specifically, a corresponding field may be self-defined in an LLDP Ethernet frame format defined in IEEE standard 802.1ab (IEEE standard 802.1AB-2009) to carry information used for indicating that the IP telephone supports associated login, and the IP address and the port number of the IP telephone.

The LDP Ethernet frame format includes TLV (Type type, Length length, Value value) structures defined organizationally. For example, as shown in Table 1, the Value part includes an organizationally unique identifier Organizationally unique identifier (OUI), an organizationally defined subtype Organizationally defined subtype and an organizationally defined information string Organizationally defined information string.

TABLE 1

| Type | Length | Organizationally unique identifier (OUI) | Organizationally defined subtype | Organizationally defined information string |
|---|---|---|---|---|
| 7 bits-127 | 9 bits | 24 bits | 8 bits | 0-507 octets |

Specifically, a corresponding field may be defined in TLV structures defined organizationally to carry information used for indicating that the IP telephone supports associated login, and the IP address and the port number of the IP telephone, as shown in Table 2:

TABLE 2

| Type | Length | Organizationally unique identifier (OUI) | Organizationally defined subtype | Organizationally defined information string |
|---|---|---|---|---|
| 7 bits-127 | 9 bits | 24 bits | 8 bits | LoginwithClient; ipaddress:port |

The LLDP message includes a LoginwithClient field, indicating that the IP telephone supports associated login; and an ipaddress:port field in the LLDP message records the IP address and the port number of the IP telephone.

After receiving the LLDP message, the communication client determines, according to the LLDP message, whether the IP telephones support associated login, for example, determines whether the LLDP message includes the LoginWithClient field, if yes, determines that the IP telephone supports associated login, and executes subsequent steps; otherwise, executes no subsequent steps.

It should be noted that, a network adapter of the PC where the communication client is located receives the LLDP message through a LAN port connected to the IP telephone. When determining that a destination address of the LLDP message is an LLDP broadcast MAC address (for example 01:80:c2:00:00:0e or 01:80:c2:00:00:03 or 01:80:c2:00:00:00), a network adapter driver of the network adapter reports the LLDP message to an operating system on the PC, and the operating system transmits the LLDP message to the communication client when determining that the communication client on the PC is running.

Step 304: The communication client returns an LLDP response to the IP telephone, where the LLDP response includes an IP address of a PC where the communication client is located and a port number of the communication client.

The port number is specifically a monitoring port number of the communication client.

Specifically, a corresponding field may be defined in TLV structures defined organizationally to carry the IP address of the PC where the communication client is located and the port number of the communication client, as shown in Table 3:

TABLE 3

| Type | Length | Organization-ally unique identifier (OUI) | Organizationally defined subtype | Organizationally defined information string |
|---|---|---|---|---|
| 7 | 9 bits | 24 bits | 8 bits | ipaddress:port |
| bits-127 | | | | |

The communication client and the IP telephone establish a socket Socket communication connection based on an IP according to the IP address and the port number of the two parties.

Preferably, to ensure the security, the IP telephone determines whether the LLDP response is received through a LAN port (for example, LAN2 in FIG. 1) connected to the PC, if yes, executes subsequent steps; if not, discards the LLDP response, and executes subsequent steps no longer, to prevent other apparatuses from masquerading as the communication client to send the LLDP message to the IP telephone through other LAN ports (for example, LAN1 in FIG. 1) of the IP telephone, so as to complete the subsequent communication process.

It should be noted that, after detecting that the IP telephone is connected to the PC through the LAN port, the IP telephone may send the LLDP message to the PC regularly (for example, sending an LLDP message every minute) through the LAN port connected to the PC. Before step 301, the PC may also receive the LLDP message sent by the IP telephone. If when the PC receives the LLDP message, the communication client is not running, the LLDP message received by the PC cannot be reported to the communication client. If when the PC receives the LLDP message, the communication client is running (no matter whether a communication server is logged in through a communication account), the LLDP message received by the PC is reported to the communication client, and after receiving the LLDP message, the communication client sends a response message of the LLDP message to the IP telephone.

Step 305: The communication client sends an associated number obtaining request to the communication server.

It should be noted that, the sequence for performing step 304 and step 305 is not limited.

Step 306: The communication server returns an IP telephone number 6000 associated with the communication account to the communication client.

Step 307: The communication client sends the received IP telephone number to the IP telephone.

Specifically, the communication client sends the IP telephone number to the IP telephone through the socket communication connection.

Step 308: The IP telephone sends a login request to the communication server, where the login request includes the IP telephone number.

If the IP telephone has used another IP telephone number (for example, 7000) to execute a login operation and has not logged out the IP telephone number, the IP telephone may log out of the IP telephone number and then execute step 308. Optionally, the IP telephone may also not log out of the IP telephone number, but select an idle line to execute step 308 to use the obtained IP telephone number to log through the idle line.

Step 309: The communication server returns a login success response to the IP telephone.

Step 310: The communication client detects a logout operation instruction.

Specifically, for example, the communication client detects that the user clicks a "logout" button on the communication client.

Step 311: The communication client instructs the IP telephone to log out of the IP telephone number 6000

Specifically, the communication client sends a logout instruction to the IP telephone to instruct the IP telephone to log out of the IP telephone number.

Step 312: The IP telephone sends a logout request to the communication server to log out of the IP telephone number.

Step 313: The communication server returns a logout success response to the IP telephone.

Step 314: The communication client logs out of the communication account.

It should be noted that, step 314 may also be executed before step 312, or executed between step 312 and step 313.

Optionally, the IP telephone may send, after receiving a logout success response, a notification message indicating that the IP telephone number has been logged out of the communication client, and the communication client logs out of the communication account after receiving the notification message.

The exemplary implementation manner B of Embodiment 1 of the present invention is described below with reference to FIG. 4.

Steps 401-403 are the same as steps 301-303 of the exemplary implementation manner A.

Step 404: The communication client returns an LLDP response to the IP telephone, where the LLDP response includes information used for indicating that communication client has logged in, the IP address of the PC where the communication client is located and the port number of the communication client, where the port number is specifically a monitoring port number of the communication client.

Specifically, a corresponding field may be defined in TLV structures defined organizationally to carry the information used for indicating that the communication client has logged in, the IP address of the PC where the communication client is located and the port number of the communication client, as shown in Table 4:

TABLE 4

| Type | Length | Organization-ally unique identifier (OUI) | Organizationally defined subtype | Organizationally defined information string |
|---|---|---|---|---|
| 7 | 9 bits | 24 bits | 8 bits | ClientLogined; |
| bits-127 | | | | ipaddress:port |

A ClientLogined field included in the LLDP response indicates that the communication client has logged in; and the ipadddress:port field records the IP address of the PC where the communication client is located and the port number of the communication client.

The communication client and the IP telephone establish a Socket communication connection based on an IP according to the IP address and the port number of the two parties.

Preferably, to ensure the security, the IP telephone determines whether the LLDP response is received through a LAN port connected to the PC where the communication client is located, if yes, executes subsequent steps; if not, discards the LLDP response, and executes subsequent steps no longer, to prevent other apparatuses from masquerading as the communication client to send the LLDP message to the IP telephone through other LAN ports (for example, LAN1 in FIG. 1) of the IP telephone, so as to complete the subsequent communication process.

It should be noted that, after detecting that the IP telephone is connected to the PC through the LAN port, the IP telephone may send the LLDP message to the PC regularly (for example, sending an LLDP message every minute) through the LAN port connected to the PC. Before step 401, the PC may also receive the LLDP message sent by the IP telephone. If when the PC receives the LLDP message, the communication client is not running, the LLDP message received by the PC cannot be reported to the communication client.

If when the PC receives the LLDP message, the communication client is running, the LLDP message received by the PC is reported to the communication client. After receiving the LLDP message, the communication client sends a response message of the LLDP message to the IP telephone.

In the exemplary implementation manner B, assuming that when receiving the LLDP message, the communication client has used the communication account to log in to the communication server, the communication client sends the response message of the LLDP message, which includes information indicating that the communication client has logged in, to the IP telephone. Alternatively, if when receiving the LLDP message, the communication client has not used the communication account to log in to the communication server, the communication client sends the response message of the LLDP message, which includes information indicating that the communication client has not logged, to the IP telephone, and subsequently when the communication client has used the communication account to log in to the communication server, sends to the IP telephone according to the IP address and the port number of the IP telephone, the information indicating that the communication client has logged in.

Step 405: The IP telephone sends a login application request to the communication client.

Specifically, the IP telephone determines whether the LLDP response includes information used for indicating that the communication client has logged in, and if including, sends the login application request to the communication client according to the IP address of the PC and the port number of the communication client.

Step 406: The communication client sends a login application response to the IP telephone.

Step 407: After receiving the login application request sent by the IP telephone to the communication server, the communication client sends an associated number obtaining request.

Steps 408-416 are the same as steps 306-314 of the exemplary implementation manner A.

It should be noted that, the communication client may also first not execute step 406, but send the login application response that carries the IP telephone number to the IP telephone after receiving the IP telephone number returned by the communication server in step 408.

Optionally, if the communication server to which the communication client logs in is the same as the communication server to which the IP telephone logs in, to ensure the security of number portability, the IP telephone may further receive, before logging, first authentication information that is sent by the communication client and received by the communication client from the communication server, and when executing a login operation, send to the communication server a login request that carries the IP telephone number and the first authentication information, so that the communication server performs, after receiving the login request, authentication on the IP telephone by using the first authentication information.

Specifically, in step 220, the communication client receives the IP telephone number associated with the communication account and the first authentication information from the communication server (for example, a random number generated by the communication server) and sends the IP telephone number and the first authentication information to the IP telephone in step 230, and the IP telephone executes the login operation by using the received IP telephone number and the first authentication information in step 240.

If the communication server to which the communication client logs in is the same as the communication server to which the IP telephone logs in, the IP telephone may further send, before logging, second authentication information (for example, a random number generated by the IP telephone) to the communication server through the communication client, in subsequent logging, encrypt login information (for example, the IP telephone number, or the IP telephone number and the first authentication information) by using the second authentication information, and carry the encrypted login information into the login request to send the login request to the communication server. After receiving the login request, the communication server decrypts the encrypted login information included in the login request by using the previously received second authentication information.

The communication client may further send third authentication information (for example, a random number generated by the communication client) to the IP telephone before sending the IP telephone number to the IP telephone, and subsequently encrypt data (for example, the IP telephone number, the IP telephone number and the first authentication information) sent to the IP telephone by using the third authentication information and send the encrypted data to the IP telephone, and after receiving the encrypted data, the IP telephone decrypts the encrypted data by using the previously received third authentication information and uses the decrypted IP telephone number to execute the login operation.

By using one or more combinations of the first authentication information, the second authentication information and the third authentication information, even if other malicious users intercept part of information, it is not easy to forge login information of an IP telephone to perform subsequent communication processes, thereby ensuring the communication security.

Preferably, data transmitted between a communication client and a communication server may be further encrypted by using a communication account corresponding to the communication client and a password thereof, thereby ensuring the security of the communication between the communication client and the communication server.

Figure 5:
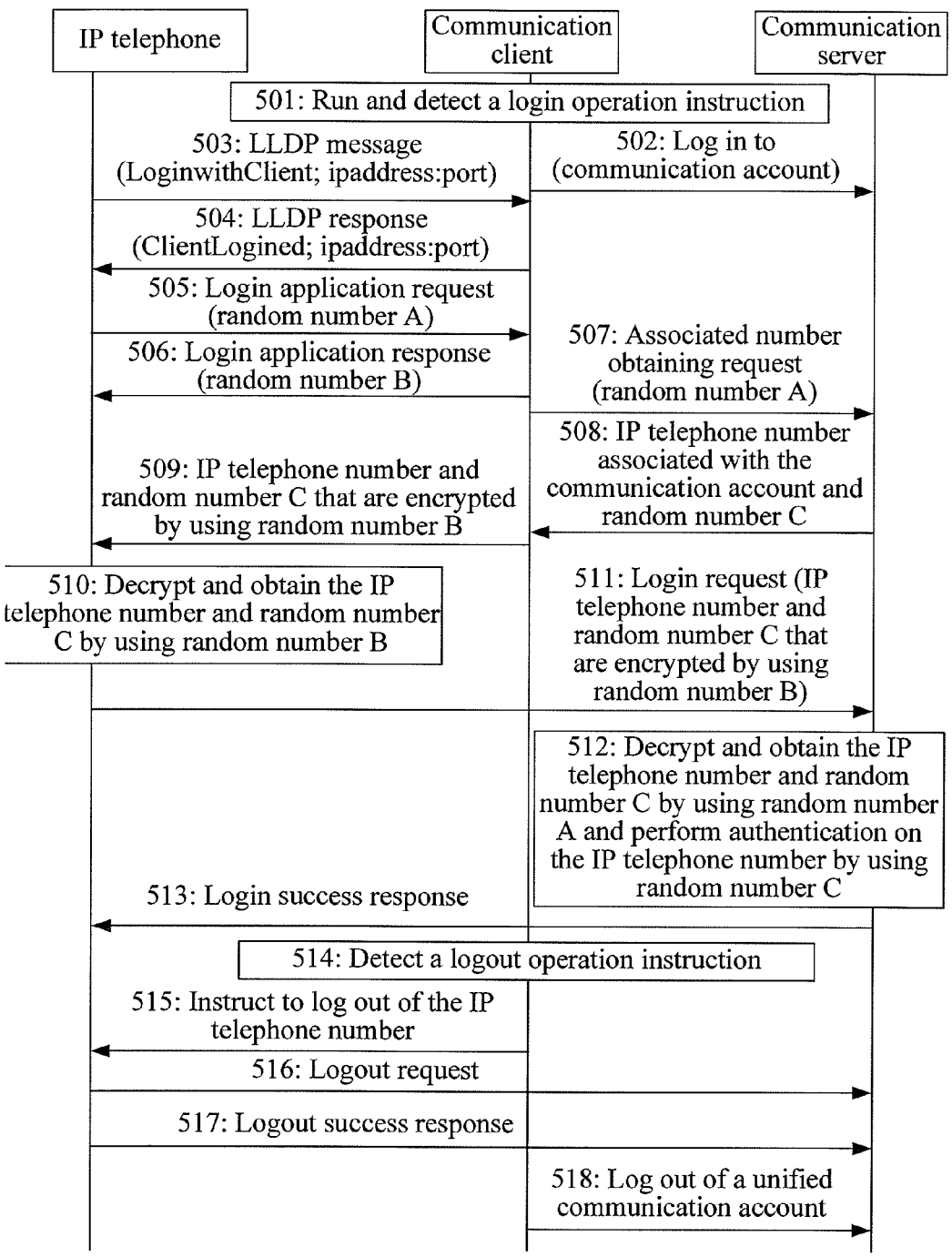
FIG. 5 is a schematic flowchart of an optional implementation manner according to Embodiment 1 of the present invention.

An optional implementation manner of Embodiment 1 of the present invention is described below with reference to FIG. 5.

The application scenario is the same as the application scenarios of the exemplary implementation manners A and B of Embodiment 1 of the present invention.

Steps 501-504 are the same as steps 401-404 of the exemplary implementation manner B.

Step 505: The IP telephone sends a login application request to the communication client, where the login application request includes a random number generated by the IP telephone (subsequently referred to as random number A).

Specifically, the IP telephone determines whether the LLDP response received in step 504 includes information used for indicating that the communication client has logged in, and if including, sends the login application request to the communication client.

Step 506: The communication client sends a login application response to the IP telephone.

The login application response includes a random number generated by the communication client (subsequently referred to as random number B).

Step 507: After receiving the login application request sent by the IP telephone to the communication server, the communication client sends an associated number obtaining request.

The associated number obtaining request includes random number A received from the IP telephone, where the random number A may be encrypted by using the communication account and its corresponding password.

Step 508: The communication server returns the IP telephone number associated with the communication account and a random number (subsequently referred to as random number C) generated by the communication server to the communication client.

After receiving random number A, if random number A is encrypted by using the communication account and the password, the communication server performs decryption by using the communication client logged in by the locally stored communication account and password to obtain random number A Preferably, the communication server encrypts the IP telephone number and random number C by using the communication account and password and sends them to the communication client.

Step 509: The communication client encrypts the IP telephone number received from the communication server and random number C by using random number B and sends them to the IP telephone.

If the IP telephone number and random number C are encrypted by using the communication account and password, the communication client first performs decryption by using the corresponding communication account and password to obtain the IP telephone number and random number C, and then encrypts the IP telephone number received from the communication server and random number C by using random number B and sends them to the IP telephone.

Step 510: After receiving the IP telephone number and random number C encrypted by using random number B, the IP telephone decrypts and obtains the IP telephone number and random number C by using random number B received in step 506.

Step 511: The IP telephone sends a login request to the communication server, where the login request includes the IP telephone number and random number C encrypted by using random number A.

Step 512: After receiving the login request, the communication server decrypts and obtains the IP telephone number and random number C by using random number A, and verifies whether random number C carried in the login request matches random number C sent in step 508, and if matching, execute subsequent steps.

Steps 513-518 are the same as steps 411-416.

By using random number A, random number B and random number C, if other malicious users intercept part of information, it is not easy to forge login information of an IP telephone, thereby ensuring the communication security to some extent.

For a brief description, the foregoing method embodiments are expressed as a series of actions and combinations. However, a person skilled in the art should know that, the present invention is not limited by the order of the described actions, because according to the present invention, some steps may be performed in other orders or simultaneously. Secondly, a person skilled in the art should also know that, the embodiments described in this specification are all exemplary embodiments, and the involved actions and modules are not necessarily required by the present invention.

According to Embodiment 1 of the present invention, Embodiment 2 of the present invention provides a communication apparatus 500.

Figure 6:
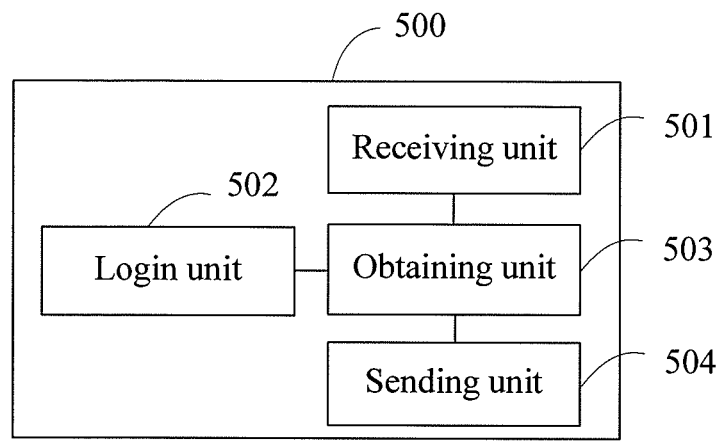
FIG. 6 to FIG. 8 are schematic structural diagrams of a communication apparatus according to Embodiment 2 of the present invention.

As shown in FIG. 6, the communication apparatus includes: a receiving unit 501, a login unit 502, an obtaining unit 503 and a sending unit 504.

The receiving unit 501 is configured to receive a neighbor discovery protocol message of a data link layer sent by an IP telephone, where the neighbor discovery protocol message includes an IP address and a port number of the IP telephone.

Specifically, the receiving unit 501 is configured to receive the neighbor discovery protocol message through a network adapter of a PC where the communication apparatus is located, where a network adapter driver of the network adapter reports the neighbor discovery protocol message to an operating system on the PC after determining that the network adapter receives the neighbor discovery protocol message, so that the operating system transmits the neighbor discovery protocol message to the communication apparatus. Preferably, the neighbor discovery protocol message is specifically a link layer discovery protocol LLDP message; correspondingly, reporting, by the network adapter driver of the network adapter, the neighbor discovery protocol message to an operating system on the PC after determining that the network adapter receives the neighbor discovery protocol message, specifically includes: reporting, by the network adapter driver of the network adapter, the neighbor discovery protocol message to the operating system of the PC when determining that the neighbor discovery protocol message is an LLDP message according to a destination address of the neighbor discovery protocol message received by the network adapter.

The login unit 502 is configured to use a communication account to log in to a communication server.

The obtaining unit 503 is configured to: when the receiving unit 501 receives the neighbor discovery protocol message, and determines that the login unit 502 has used the communication account to log in to the communication server, obtain, from the communication server, an IP telephone number associated with the communication account, and transmit the IP telephone number to the sending unit 504.

The sending unit 504 is configured to receive the IP telephone number from the obtaining unit 503, and send the IP telephone number to the IP telephone according to the IP address and the port number of the IP telephone, so that the IP telephone uses the IP telephone number to execute a login operation.

Figure 7:
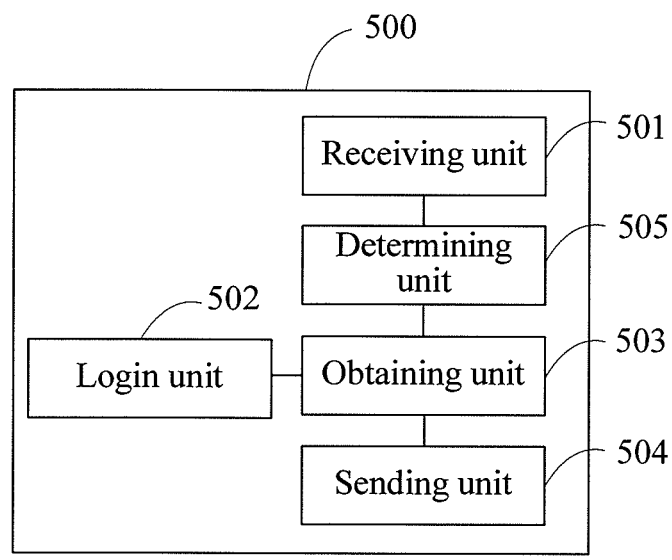

Preferably, as shown in FIG. 7, the communication apparatus further includes a judging unit 505.

The receiving unit 501 is further configured to transmit the neighbor discovery protocol message to the judging unit 505.

The judging unit 505 is configured to receive the neighbor discovery protocol message from the receiving unit 501, determine whether the neighbor discovery protocol message includes information indicating that the IP telephone supports associated login, and transmit a determination result to the obtaining unit 503, where the information indicating that the IP telephone supports associated login is specifically used for indicating that the IP telephone supports using an IP telephone number associated with a communication account of a communication apparatus that has logged in to execute a login operation.

The obtaining unit 503 is specifically configured to receive the determination result from the judging unit 505, and when the determination result is yes, obtain, from the communication server, the IP telephone number associated with the communication account.

Preferably, the sending unit 504 may further be configured to send, to the IP telephone, information indicating that the communication apparatus has logged in, an IP address of a personal computer PC where the communication apparatus is located and a port number of the communication apparatus; and correspondingly, the receiving unit 501 is further configured to receive a login application request sent by the IP telephone according to the IP address of the PC and the port number of the communication apparatus when the IP telephone determines that the communication apparatus has logged in.

Further preferably, the sending unit 504 being configured to send, to the IP telephone, information indicating that the communication apparatus has logged in, the IP address of the PC and the port number of the communication apparatus, specifically includes:

the sending unit being configured to send a response message of the neighbor discovery protocol message to the IP telephone, where the response message includes the information indicating that the communication apparatus has logged in, the IP address of the PC and the port number of the communication apparatus; or, the sending unit being configured to send a response message of the neighbor discovery protocol message to the IP telephone, where the response message includes the IP address of the PC and the port number of the communication apparatus, and configured to send, according to the IP address and the port number of the IP telephone, the information indicating that the communication apparatus has logged in.

Figure 8:
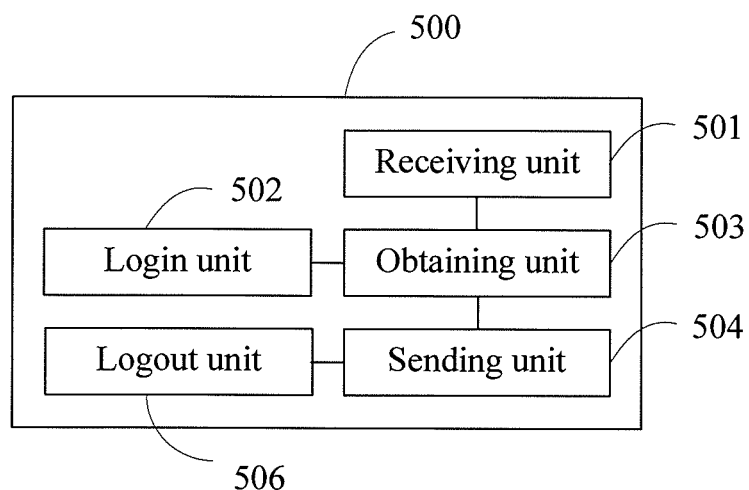

Preferably, as shown in FIG. 8, the communication apparatus further includes a logout unit, configured to log out of the communication account when detecting a user operation used for indicating logout of the communication account, and instructing the IP telephone to log out of the IP telephone number. Specifically, the sending unit 503 sends a logout request to the communication server to log out of the communication account; and the sending unit 503 sends a logout instruction to the IP telephone to instruct the IP telephone to log out of the IP telephone number.

Functional units described in Embodiment 2 of the present invention may be used to implement the method of Embodiment 1.

According to Embodiment 1 of the present invention, Embodiment 3 of the present invention provides an IP telephone 600.

Figure 9:
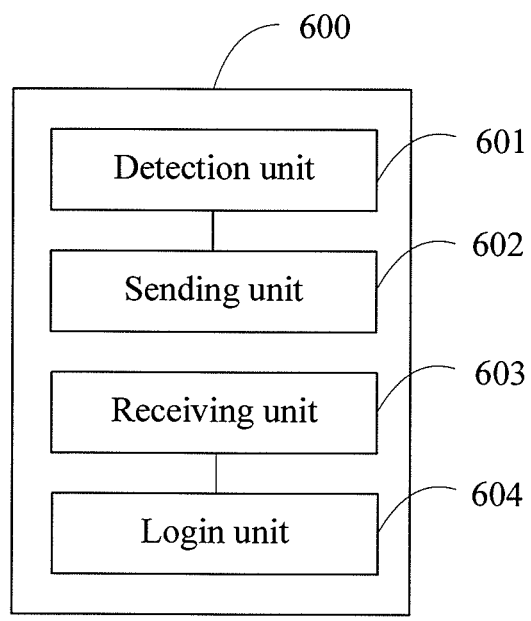
FIG. 9 to FIG. 11 are schematic structural diagrams of an IP telephone according to Embodiment 3 of the present invention.

As shown in FIG. 9, the IP telephone includes: a detection unit 601, a sending unit 602, a receiving unit 603 and a login unit 604.

The detection unit 601 is configured to detect whether an Ethernet port of the IP telephone is connected to a personal computer PC, and transmit a detection result to the sending unit 602.

The sending unit 602 is configured to receive the detection result sent by the detection unit, and when the detection result is that the Ethernet port of the IP telephone is connected to the PC, send a neighbor discovery protocol message of a data link layer to the PC, so that when it is determined that a communication client is running on the PC, the PC transmits the neighbor discovery protocol message to the communication client, where the neighbor discovery protocol message includes an IP address and a port number of the IP telephone.

The receiving unit 603 is configured to receive an IP telephone number associated with the communication account and sent by the communication client according to the IP address and the port number of the IP telephone when the communication client determines that the communication client has used a communication account to log in to a communication server, and transmit the IP telephone number to the login unit 604.

The login unit 604 is configured to receive the IP telephone number from the receiving unit 603, and use the IP telephone number to execute a login operation.

The neighbor discovery protocol message sent by the sending unit 602 includes information indicating that the IP telephone supports associated login, so that the communication client sends the IP telephone number to the IP telephone when determining, according to the neighbor discovery protocol message, that the IP telephone supports associated login, where the information indicating that the IP telephone supports associated login is specifically used for indicating that the IP telephone supports using an IP telephone number associated with a communication account of a communication client that has logged in to execute a login operation.

Figure 10:
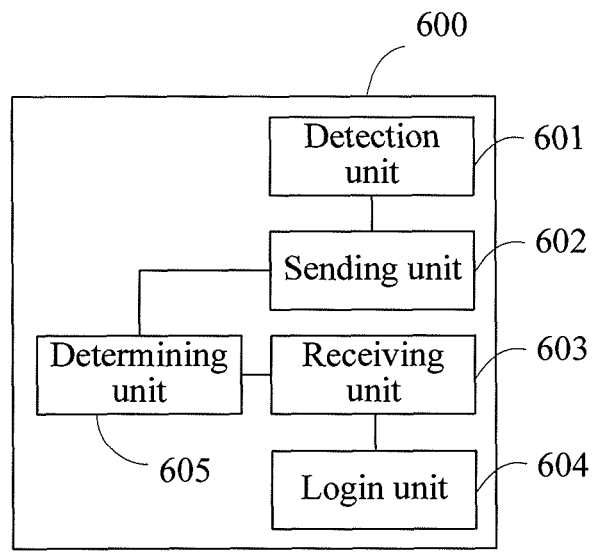

As shown in FIG. 10, preferably, the IP telephone further includes a determining unit 605.

The receiving unit 603 is further configured to receive information sent by the communication client indicating that the communication client has logged in, an IP address of the PC and a port number of the communication client.

The determining unit 605 is configured to determine, according to the information indicating that the communication client has logged in, that the communication client has logged in, and transmit a determination result to the sending unit 602.

The sending unit 602 is further configured to receive the determination result sent by the determining unit, and send a login application request to the communication client according to the IP address of the PC and the port number of the communication client.

Further preferably, the receiving unit 603 being configured to receive information sent by the communication client indicating that the communication client has logged in, an IP address of the PC and a port number of the communication client specifically includes:

the receiving unit 603 being configured to receive a response message of the neighbor discovery protocol message sent by the communication client, where the response message includes the information indicating that the communication client has logged in, the IP address of the PC and the port number of the communication client; or, the receiving unit 603 being configured to receive a response message of the neighbor discovery protocol message sent by the communication client, where the response message includes the IP address of the PC and the port number of the communication client, and configured to receive the information indicating that the communication client has logged in that is sent by the communication client according to the IP address and the port number of the IP telephone.

Figure 11:
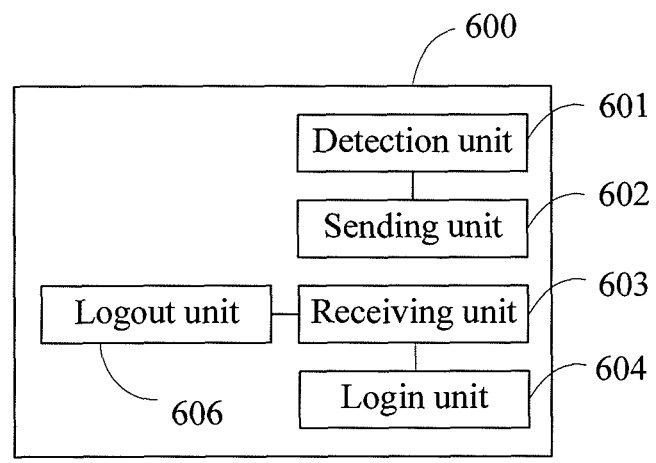

As shown in FIG. 11, preferably, the IP telephone further includes a logout unit 606.

The receiving unit 603 is further configured to receive a logout instruction sent by the communication client, and transmit the logout instruction to the logout unit 606.

The logout unit 606 is configured to receive the logout instruction from the receiving unit 603, and log out of the IP telephone number.

Functional units described in Embodiment 3 of the present invention may be used to implement the method of Embodiment 1.

Figure 12:
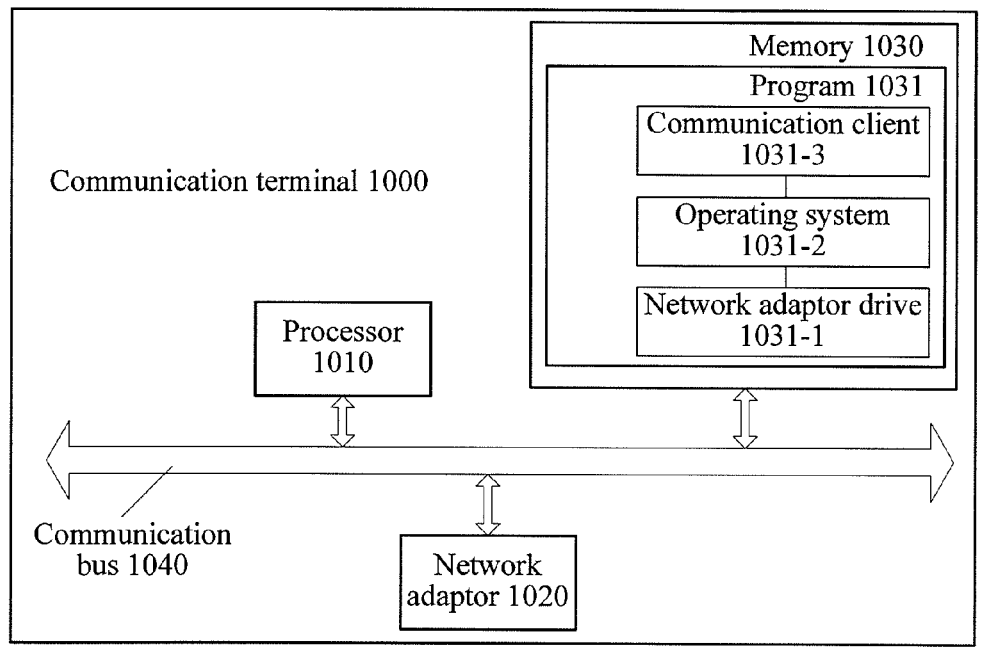
FIG. 12 is a schematic structural diagram of a communication terminal according to Embodiment 4 of the present invention.

As shown in FIG. 12, Embodiment 4 of the present invention provides a communication terminal 1000, including: a processor (processor) 1010, a network adapter 1020, a memory (memory) 1030 and a bus 1040, where, mutual communication is completed between the processor 1010, the network adapter 1020 and the memory 1030 through the bus 1040.

The network adapter 1020 is configured to communicate with a network element, for example, communicate with an IP telephone and a communication server.

The memory 1030 is configured to store a program 1031, and specifically, the program 1031 may include program codes, where the program codes include a computer operating instruction. The memory 1030 may include a high-speed RAM memory, or include a non-volatile memory (non-volatile memory), for example, at least a disk memory.

The processor 1010 is configured to execute the program 1031 stored in the memory 1030. The processor 1010 may specifically be a central processing unit (CPU, central processing unit), which is computer core unit.

Specifically, the network adapter 1020 is configured to receive a neighbor discovery protocol message of a data link layer sent by an IP telephone, where the neighbor discovery protocol message includes an IP address and a port number of the IP telephone; and the neighbor discovery protocol message may specifically be a link layer discovery protocol LLDP message.

The program 1031 includes: a network adapter driver 1031-1, an operating system 1031-2 and a communication client 1031-3.

The network adapter driver 1031-1 is configured to report the neighbor discovery protocol message to the operating system 1031-2 after it is determined that the network adapter 1020 receives the neighbor discovery protocol message.

The operating system 1031-2 is configured to transmit the neighbor discovery protocol message to the communication client 1031-3 when it is determined that the communication client 1031-3 is running.

The communication client 1031-3 is configured to: when determining that the communication client has used the communication account to log in to the communication server, obtain, from the communication server, an IP telephone number associated with the communication account; and send the IP telephone number to the IP telephone through the network adapter 1020 according to the IP address and the port number of the IP telephone, so that the IP telephone uses the IP telephone number to execute a login operation.

After receiving data sent by the IP telephone, the network adapter 1020 sends an interrupt to the processor 1010 of the PC. The processor 1010 searches an interrupt vector table in the operating system 1031-2 according to an interrupt number included in the interrupt, to obtain an interrupt program processing address registered in the operating system 1031-2 when the network adapter driver 1031-1 of the network adapter 1020 is installed, and invokes the network adapter driver network adapter driver 1031-1 according to the interrupt program processing address. The network adapter driver 1031-1 determines whether the received data is a neighbor discovery protocol message, if yes, reports the neighbor discovery protocol message to the operating system 1031-2. When determining that the communication client 1031-3 is running according to registration information registered in the operating system 1031-2 when the communication client 1031-3 starts running, the operating system 1031-2 transmits the neighbor discovery protocol message to the communication client 1031-3 through a callback address of the registration information.

The neighbor discovery protocol message of the data link layer may specifically be one of the following messages: an LLDP (Link Layer Discovery Protocol, link layer discovery protocol) message, a CDP (Cisco Discovery Protocol, Cisco discovery protocol) message, and an LLTD (Microsoft's Link Layer Topology Discovery, Microsoft's link layer topology discovery protocol) message.

If the neighbor discovery protocol message is specifically the LLDP message, the network adapter driver 1031-1 is specifically configured to: when it is determined that the neighbor discovery protocol message is the LLDP message according to a destination address of the neighbor discovery protocol message received by the network adapter, report the neighbor discovery protocol message to the operating system of the PC, specifically, determine whether the destination address of the neighbor discovery protocol message is an LLDP broadcast MAC (Media Access Control, media access control) address (for example 01:80:c2:00:00:0e or 01:80:c2:00:00:03 or 01:80:c2:00:00:00), and if yes, determine that the received message is the LLDP message.

The communication client 1031-3 may further be configured to determine that the neighbor discovery protocol message includes information indicating that the IP telephone supports associated login, where the information indicating that the IP telephone supports associated login is specifically used for indicating that the IP telephone supports using an IP telephone number associated with a communication account of a communication client 1031-3 that has logged in to execute a login operation.

Preferably, the communication client 1031-3 is further configured to send to the IP telephone through the network adapter 1020, information indicating that the communication client 1031-3 has logged in, an IP address of the communication terminal 1000 and a port number of the communication client 1031-3, and receive, through the network adapter 1020, a login application request sent by the IP telephone according to the IP address of the communication terminal 1000 and the port number of the communication client 1031-3 when it is determined that the communication client 1031-3 has logged in.

The communication client 1031-3 being configured to send to the IP telephone through the network adapter 1020, information indicating that the communication client 1031-3 has logged in, an IP address of the communication terminal 1000 and a port number of the communication client 1031-3 specifically includes: the communication client 1031-3 being configured to send to the IP telephone through the network adapter 1020, a response message of the neighbor discovery protocol message, where the response message includes information indicating that the communication client 1031-3 has logged in, the IP address of the communication terminal 1000 and the port number of the communication client 1031-3; or, the communication client 1031-3 being configured to send to the IP telephone through the network adapter 1020, a response message of the neighbor discovery protocol message, where the response message includes the IP address of the communication terminal 1000 and the port number of the communication client 1031-3, and configured to send to the IP telephone through the network adapter 1020, information indicating that the communication client 1031-3 has logged in according to the IP address and the port number of the IP telephone.

Preferably, the communication client 1031-3 is further configured to log out of the communication account when a user operation used for indicating logout of the communication account is detected, and instruct the IP telephone to log out of the IP telephone number.

It should be noted that, in Embodiment 4 of the present invention, sending, by the communication client 1031-3, data (for example, the IP telephone number, the information indicating the communication client 1031-3 has logged in, the IP address of the communication terminal 1000 and the port number of the communication client 1031-3, and so on) to the IP telephone through the network adapter 1020 specifically may be: invoking, by the communication client 1031-3, the network adapter driver 1031-1 through the operating system 1031-2 to send the data through the network adapter 1020.

Functional units described in Embodiment 4 of the present invention may be used to implement the method of Embodiment 1.

Figure 13:
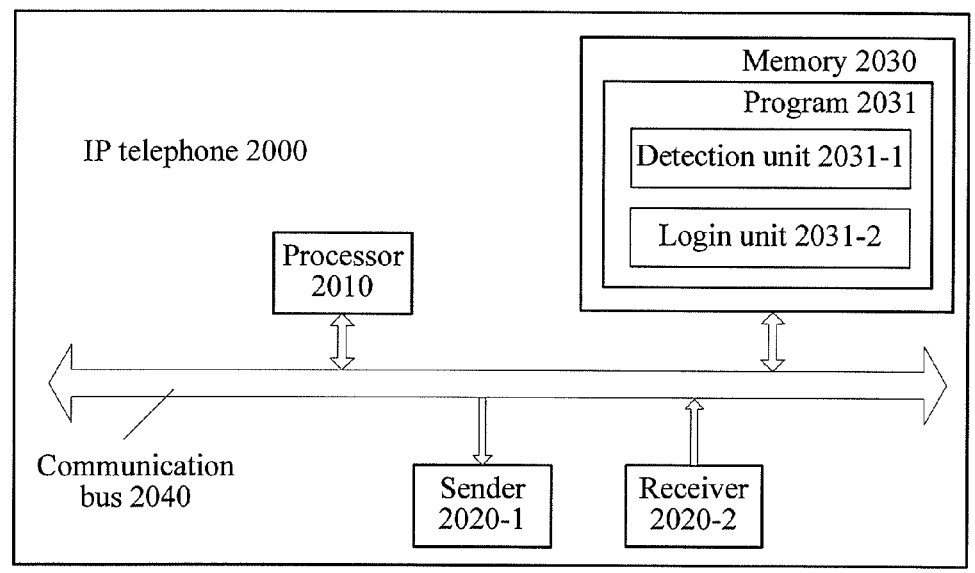
FIG. 13 is a schematic structural diagram of another apparatus of an IP telephone according to Embodiment 5 of the present invention.

As shown in FIG. 13, Embodiment 5 of the present invention provides an IP telephone 2000, including:

a processor (processor) 2010, a transmitter (transmitter) 2020-1, a receiver (receiver) 2020-2, a memory (memory) 2030 and a bus 2040, where mutual communication is completed between the processor 2010, the transmitter 2020-1, the receiver 2020-2, and the memory 2030 through the bus 2040.

The transmitter 2020-1 and the receiver 2020-2 are configured to communicate with a network element.

The memory 2030 is configured to store a program 2031, and specifically, the program 2031 may include program codes, where the program codes include a computer operating instruction. The memory 2030 may include a high-speed RAM memory, or include a non-volatile memory (non-volatile memory), for example, at least a disk memory.

The processor 2010 is configured to execute the program 2031 stored in the memory 2030. The processor 2010 may specifically be a central processing unit (CPU, central processing unit), which is computer core unit.

Specifically, the program 2031 may include: a detection unit 2031-1 and a login unit 2031-2.

The detection unit 2031-1 is configured to detect whether an Ethernet port of the IP telephone is connected to a personal computer PC.

The transmitter 2020-1 is configured to: when the detection result of the detection unit 2031-1 is that the Ethernet port of the IP telephone is connected to the PC, send a neighbor discovery protocol message of a data link layer to the PC, so that when it is determined that a communication client is running on the PC, the PC transmits the neighbor discovery protocol message to the communication client, where the neighbor discovery protocol message includes an IP address and a port number of the IP telephone; and the neighbor discovery protocol message may specifically be a link layer discovery protocol LLDP message.

The receiver 2020-2 is configured to receive an IP telephone number associated with the communication account and sent by the communication client according to the IP address and the port number of the IP telephone when the communication client determines that the communication client has used a communication account to log in to a communication server.

The login unit 2031-2 is configured to use the IP telephone number received by the receiver 2020-2 to execute a login operation.

Preferably, the neighbor discovery protocol message sent by the transmitter 2020-1 includes information indicating that the IP telephone supports associated login, so that the communication client sends the IP telephone number to the IP telephone when determining, according to the neighbor discovery protocol message, that the IP telephone supports associated login, where the information indicating that the IP telephone supports associated login is specifically used for indicating that the IP telephone supports using an IP telephone number associated with a communication account of a communication client that has logged in to execute a login operation.

Preferably, the program 2031 further includes a determining unit; the receiver 2020-2 is further configured to receive information sent by the communication client indicating that the communication client has logged in, an IP address of a personal computer PC where the communication client is located and a port number of the communication client; the determining unit is configured to determine that the communication client has logged in according to the information indicating that the communication client has logged in; and the transmitter 2020-1 is further configured to send a login application request to the communication client according to the IP address of the PC and the port number of the communication client.

Further preferably, the receiver 2020-2 being configured to receive information sent by the communication client indicating that the communication client has logged in, an IP address of a personal computer PC where the communication client is located and the port number of the communication client specifically includes: the receiver 2020-2 being configured to receive a response message of the neighbor discovery protocol message sent by the communication client, where the response message includes the information indicating that the communication client has logged in, the IP address of the PC and the port number of the communication client; or, configured to receive a response message of the neighbor discovery protocol message sent by the communication client, where the response message includes the IP address of the PC and the port number of the communication client, and configured to receive the information indicating that the communication client has logged in that is sent by the communication client according to the IP address and the port number of the IP telephone.

Preferably, the receiver 2020-2 is further configured to receive a logout instruction sent by the communication client; and the program 2031 further includes a logout unit, configured to log out of the IP telephone number when the receiver 2020-2 receives the logout instruction sent by the communication client.

For specific implementations of units in the program 2031, refer to corresponding units in Embodiment 3 of the present invention, which are not described again herein.

Functional units described in Embodiment 5 of the present invention may be used to implement the method of Embodiment 1.

According to Embodiment 1 to Embodiment 5 of the present invention, Embodiment 6 of the present invention provides a communication system 4000.

Figure 14:
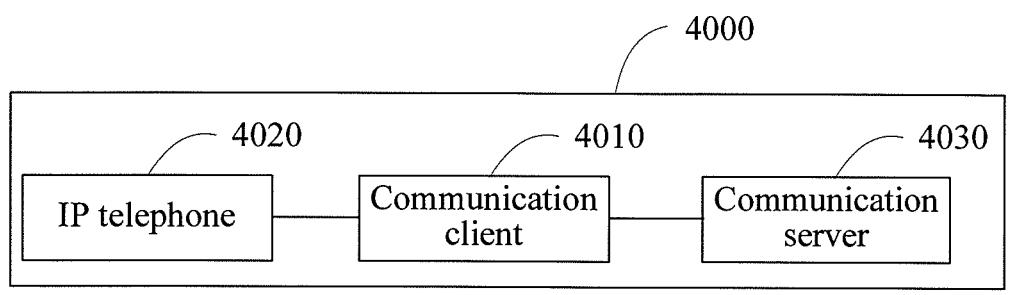
FIG. 14 is a schematic structural diagram of a communication system according to Embodiment 6 of the present invention.

As shown in FIG. 14, the communication system includes: a communication client 4010, an IP telephone 4020 and a communication server 4030, where the IP telephone 4020 is connected, through an Ethernet port, to a personal computer PC where the communication client 4010 is located.

The IP telephone 4020 is configured to: when it is detected that the Ethernet port of the IP telephone 4020 is connected to the communication client 4010, send a neighbor discovery protocol message of a data link layer to the PC, so that the PC, when determining that the communication client is running, transmits the neighbor discovery protocol message to the communication client, where the neighbor discovery protocol message includes an IP address and a port number of the IP telephone 4020; receive, when the communication client 4010 determines that the communication client 4010 has used a communication account to log in to the communication server 4030, an IP telephone number associated with the communication account and sent according to the IP address and the port number of the IP telephone 4020; and use the IP telephone number to execute a login operation. The neighbor discovery protocol message may specifically be a link layer discovery protocol LLDP message.

The communication client 4010 is configured to receive the neighbor discovery protocol message; when determining that the communication client has used the communication account to log in to the communication server 4030, obtain the IP telephone number associated with the communication account to the communication server 4030; and send the IP telephone number to the IP telephone 4020 according to the IP address and the port number of the IP telephone 4020.

The communication server 4030 is configured to send the IP telephone number associated with the communication account to the communication client 4010.

Preferably, the communication client 4010 is further configured to: when receiving the neighbor discovery protocol message, determine that the neighbor discovery protocol message includes information indicating that the IP telephone 4020 supports associated login, where the information indicating that the IP telephone supports associated login is specifically used for indicating that the IP telephone supports using an IP telephone number associated with a communication account of a communication client that has logged in to execute a login operation.

Preferably, the communication client 4010 is further configured to send to the IP telephone 4020 information indicating that the communication client 4010 has logged in, the IP address of the PC and the port number of the communication client 4010, and receive a login application request sent by the IP telephone 4020 according to the IP address of the PC and the port number of the communication client 4010 when it is determined that the communication client 4010 has logged in; and the IP telephone 4020 is further configured to receive information indicating that the communication client 4010 has logged in and sent by the communication client 4010, the IP address of the PC and the port number of the communication client 4010, and send the login application request to the communication client 4010 according to the IP address of the PC and the port number of the communication client 4010 when it is determined that the communication client 4010 has logged in.

Further preferably, the communication client 4010 being configured to send to the IP telephone 4020 information indicating that the communication client 4010 has logged in, the IP address of the PC and the port number of the communication client 4010, specifically includes: the communication client 4010 being configured to send a response message of the neighbor discovery protocol message to the IP telephone 4020, where the response message includes the information indicating that the communication client 4010 has logged in, the IP address of the PC and the port number of the communication client 4010; or, configured to send the response message of the neighbor discovery protocol message to the IP telephone 4020, where the response message includes the IP address of the PC and the port number of the communication client 4010; and configured to send, according to the IP address and the port number of the IP telephone 4020, the information indicating that the communication client 4010 has logged in.

Correspondingly, the IP telephone 4020 being configured to receive information indicating that the communication client 4010 has logged in and sent by the communication client 4010, the IP address of the PC and the port number of the communication client 4010, specifically includes: the IP telephone 4020 being configured to receive a response message of the neighbor discovery protocol message sent by the communication client 4010, where the response message includes the information indicating that the communication client 4010 has logged in, the IP address of the PC and the port number of the communication client 4010; or, configured to receive the response message of the neighbor discovery protocol message sent by the communication client 4010, where the response message includes the IP address of the PC and the port number of the communication client 4010; and configured to receive the information indicating that the communication client 4010 has logged in and sent by communication client 4010 according to the IP address and the port number of the IP telephone 4020.

Preferably, the communication client 4010 is further configured to log out of the communication account when detecting a user operation used for indicating logout of the communication account, and instruct the IP telephone 4020 to log out of the IP telephone number and log out of the communication account; and the IP telephone 4020 is further configured to log out of the IP telephone number when receiving a logout instruction sent by the communication client 4010.

The communication system described in Embodiment 6 of the present invention may be used to implement the method of Embodiment 1.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some ports. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer apparatus (which may be a personal computer, a server, or a network apparatus) to perform all or a part of the steps of the methods described in the embodiments of the present invention. The foregoing storage medium includes: any medium that can store program codes, such as a USE flash disk, a removable hard disk, a read-only memory (Read-Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing login of an Internet Protocol (IP) telephone number, the method comprising:
   receiving, by a communication client, a neighbor discovery protocol message of a data link layer sent by an IP telephone, wherein the neighbor discovery protocol message comprises an IP address and a port number of the IP telephone;
   in response to determining, by the communication client, that the communication client has used a communication account to log in to a communication server, obtaining, by the communication client, from the communication server, an IP telephone number associated with the communication account;
   and sending, by the communication client, the IP telephone number to the IP telephone according to the IP address and the port number of the IP telephone, so that the IP telephone uses the IP telephone number to execute a login operation to the communication server.

2. The method according to claim 1, wherein before obtaining, from the communication server, an IP telephone number associated with the communication account, the method further comprises:
   determining that the neighbor discovery protocol message comprises information indicating that the IP telephone supports associated login, wherein the information indicating that the IP telephone supports associated login is used for indicating that the IP telephone supports using an IP telephone number associated with a communication account of a communication client that has logged in to execute a login operation.

3. The method according to claim 1, wherein before obtaining, from the communication server, an IP telephone number associated with the communication account, the method further comprises:
   sending, by the communication client, to the IP telephone, information indicating that the communication client has logged in, an IP address of a personal computer (PC) where the communication client is located and a port number of the communication client, and receiving a login application request sent by the IP telephone according to the IP address of the PC and the port number of the communication client when the IP telephone determines that the communication client has logged in.

4. The method according to claim 1, wherein receiving, by a communication client, a neighbor discovery protocol message sent by an IP telephone comprises:
   receiving, by the communication client, the neighbor discovery protocol message through a network adapter of the PC where the communication client is located, wherein a network adapter driver of the network adapter reports the neighbor discovery protocol message to an operating system on the PC after determining that the network adapter receives the neighbor discovery protocol message, so that the operating system transmits the neighbor discovery protocol message to the communication client when determining that the communication client is running.

5. The method according to claim 4, wherein:
   the neighbor discovery protocol message is a link layer discovery protocol (LLDP) message; and
   reporting, by a network adapter driver of the network adapter, the neighbor discovery protocol message to an operating system on the PC after determining that the network adapter receives the neighbor discovery protocol message comprises:
   reporting, by the network adapter driver of the network adapter, the neighbor discovery protocol message to the operating system on the PC when determining that the neighbor discovery protocol message is the LLDP message according to a destination address of the neighbor discovery protocol message received by the network adapter.

6. The method according to claim 1, wherein after sending, by the communication client, the IP telephone number to the IP telephone according to the IP address and the port number of the IP telephone, the method further comprises:
   logging out of, by the communication client, the communication account when a user operation used for indicating logout of the communication account is detected, and instructing the IP telephone to log out of the IP telephone number.

7. A method for implementing login of an Internet Protocol (IP) telephone number, the method comprising:
   when an IP telephone detects that an Ethernet port of the IP telephone is connected to a personal computer (PC), sending a neighbor discovery protocol message of a data link layer to the PC, so that when the PC determines that a communication client is running on the PC, the PC transmits the neighbor discovery protocol message to the communication client, wherein the neighbor discovery protocol message comprises an IP address and a port number of the IP telephone;
   receiving, by the IP telephone, an IP telephone number associated with the communication account and sent by the communication client according to the IP address and the port number of the IP telephone when the communication client determines that the communication client has used a communication account to log in to a communication server;
   and using, by the IP telephone, the IP telephone number to execute a login operation to the communication server.

8. The method according to claim 7, wherein the neighbor discovery protocol message comprises information indicating that the IP telephone supports associated login, so that the communication client sends the IP telephone number to the IP telephone when determining, according to the neighbor discovery protocol message, that the IP telephone supports associated login, wherein the information indicating that the IP telephone supports associated login is used for indicating that the IP telephone supports using an IP telephone number associated with a communication account of a communication client that has logged in to execute a login operation.

9. The method according to claim 7, wherein before receiving, by the IP telephone, an IP telephone number associated with the communication account and sent by the communication client according to the IP address and the port number of the IP telephone when the communication client determines that the communication client has used a communication account to log in to a communication server, the method further comprises:
receiving, by the IP telephone, information sent by the communication client indicating that the communication client has logged in, an IP address of the PC and a port number of the communication client, and when determining that the communication client has logged in, sending a login application request to the communication client according to the IP address of the PC and the port number of the communication client.

10. The method according to claim 9, wherein before sending a login application request to the communication client according to the IP address of the PC and the port number of the communication client, the method further comprises:
determining that the response message is received through the Ethernet port connected to the PC.

11. The method according to claim 7, wherein after using, by the IP telephone, the IP telephone number to execute a login operation, the method further comprises:
when receiving a logout instruction sent by the communication client, logging out of, by the IP telephone, the IP telephone number.

12. A communication apparatus, comprising:
a receiving unit implemented by a network adapter, a login unit implemented by a processor, an obtaining unit implemented by the processor, and a sending unit implemented by the network adapter, wherein:
the receiving unit is configured to receive a neighbor discovery protocol message of a data link layer sent by an IP telephone, wherein the neighbor discovery protocol message comprises an IP address and a port number of the IP telephone;
the login unit is configured to use a communication account to log in to a communication server;
the obtaining unit is configured to: when the receiving unit receives the neighbor discovery protocol message, and determines that the login unit has used the communication account to log in to the communication server, obtain, from the communication server, an IP telephone number associated with the communication account, and transmit the IP telephone number to the sending unit; and
the sending unit is configured to receive the IP telephone number from the obtaining unit, and send the IP telephone number to the IP telephone according to the IP address and the port number of the IP telephone, so that the IP telephone uses the IP telephone number to execute a login operation to the communication server.

13. The communication apparatus according to claim 12, further comprising a judging unit implemented by the processor, and wherein:
the receiving unit is further configured to transmit the neighbor discovery protocol message to the judging unit;
the judging unit is configured to receive the neighbor discovery protocol message from the receiving unit, determine whether the neighbor discovery protocol message comprises information indicating that the IP telephone supports associated login, and transmit a determination result to the obtaining unit, wherein the information indicating that the IP telephone supports associated login is used for indicating that the IP telephone supports using an IP telephone number associated with a communication account of a communication apparatus that has logged in to execute a login operation; and
the obtaining unit is configured to receive the determination result from the judging unit, and when the determination result is yes, obtain, from the communication server, the IP telephone number associated with the communication account.

14. The communication apparatus according to claim 12, wherein:
the sending unit is further configured to send, to the IP telephone, information indicating that the communication apparatus has logged in, an IP address of a personal computer (PC) where the communication apparatus is located and a port number of the communication apparatus; and
the receiving unit is further configured to receive a login application request sent by the IP telephone according to the IP address of the PC and the port number of the communication apparatus when the IP telephone determines that the communication apparatus has logged in.

15. The communication apparatus according to claim 12, further comprising a logout unit implemented by the processor, configured to log out of the communication account when a user operation used for indicating logout of the communication account is detected, and instruct the IP telephone to log out of the IP telephone number.

16. An Internet Protocol (IP) telephone, comprising:
a detection unit implemented by a processor, a sending unit implemented by a network adapter, a receiving unit implemented by the network adapter, and a login unit implemented by the processor, wherein:
the detection unit is configured to detect whether an Ethernet port of the IP telephone is connected to a personal computer (PC), and transmit a detection result to the sending unit;
the sending unit is configured to receive the detection result sent by the detection unit, and when the detection result is that the Ethernet port of the IP telephone is connected to the PC, send a neighbor discovery protocol message of a data link layer to the PC, so that when it is determined that a communication client is running on the PC, the PC transmits the neighbor discovery protocol message to the communication client, wherein the neighbor discovery protocol message comprises an IP address and a port number of the IP telephone;
the receiving unit is configured to receive an IP telephone number associated with the communication account and sent by the communication client according to the IP address and the port number of the IP telephone when the communication client determines that the communication client has used a communication account to log in to a communication server; and
the login unit is configured to receive the IP telephone number from the receiving unit, and use the IP telephone number to execute a login operation to the communication server.

17. The IP telephone according to claim 16, wherein the neighbor discovery protocol message sent by the sending unit comprises information indicating that the IP telephone supports associated login, so that the communication client sends the IP telephone number to the IP telephone when determining, according to the neighbor discovery protocol message, that the IP telephone supports associated login, wherein the information indicating that the IP telephone supports associated login is used for indicating that the IP telephone supports using an IP telephone number associated with a communication account of a communication client that has logged in to execute a login operation.

18. The IP telephone according to claim 16, further comprising a determining unit implemented by the processor, and wherein:

the receiving unit is further configured to receive information sent by the communication client indicating that the communication client has logged in, an IP address of the PC and a port number of the communication client;

the determining unit is configured to determine, according to the information indicating that the communication client has logged in, that the communication client has logged in, and transmit a determination result to the sending unit; and the sending unit is further configured to receive the determination result sent by the determining unit, and send a login application request to the communication client according to the IP address of the PC and the port number of the communication client.

19. The IP telephone according to claim 16, further comprising a logout unit implemented by the processor, and wherein:

the receiving unit is further configured to receive a logout instruction sent by the communication client, and transmit the logout instruction to the logout unit; and the logout unit is configured to receive the logout instruction from the receiving unit, and log out of the IP telephone number.

20. A communication system, comprising:

an Internet Protocol (IP) telephone, a communication client and a communication server, and wherein:

the IP telephone is connected, through an Ethernet port, to a personal computer (PC) where the communication client is located;

the IP telephone is configured to: when it is detected that the Ethernet port of the IP telephone is connected to the PC, send a neighbor discovery protocol message of a data link layer to the PC, so that the PC, when determining that the communication client is running, transmits the neighbor discovery protocol message to the communication client, wherein the neighbor discovery protocol message comprises an IP address and a port number of the IP telephone;

receive an IP telephone number associated with the communication account and sent by the communication client according to the IP address and the port number of the IP telephone when the communication client determines that the communication client has used a communication account to log in to a communication server; and use the IP telephone number to execute a login operation to the communication server;

the communication client is configured to receive the neighbor discovery protocol message; when determining that the communication client has used the communication account to log in to the communication server, obtain, from the communication server, the IP telephone number associated with the communication account; and send the IP telephone number to the IP telephone according to the IP address and the port number of the IP telephone; and the communication server is configured to send the IP telephone number associated with the communication account to the communication client.

* * * * *